United States Patent [19]

Williams

[11] Patent Number: 6,031,702
[45] Date of Patent: Feb. 29, 2000

[54] SHORT CIRCUIT PROTECTED DC-DC CONVERTER USING DISCONNECT SWITCHING AND METHOD OF PROTECTING LOAD AGAINST SHORT CIRCUITS

[75] Inventor: Richard K. Williams, Cupertino, Calif.

[73] Assignee: Siliconix Incorporated, Santa Clara, Calif.

[21] Appl. No.: 08/956,257

[22] Filed: Oct. 22, 1997

[51] Int. Cl.[7] .................................................. H02H 3/18
[52] U.S. Cl. ............................... 361/87; 361/18; 361/101
[58] Field of Search .................................. 361/18, 87, 93, 361/98, 100, 101; 323/274–277

[56] References Cited

U.S. PATENT DOCUMENTS

| | | | |
|---|---|---|---|
| 5,654,859 | 8/1997 | Shi | 361/66 |
| 5,689,144 | 11/1997 | Williams | 307/130 |
| 5,818,084 | 10/1998 | Williams et al. | 257/329 |
| 5,847,912 | 12/1998 | Smith et al. | 361/93 |

*Primary Examiner*—Jeffrey Gaffin
*Assistant Examiner*—Michael Sherry
*Attorney, Agent, or Firm*—Skjerven, Morrill MacPherson, Franklin & Friel LLP; David E. Steuber

[57] ABSTRACT

A four-terminal MOSFET, in which no combination of the source, drain, body and gate terminals are permanently connected together, is used as a synchronous rectifier capable of blocking an excessive current in a switching mode DC—DC converter resulting from a short-circuited load. In an N-channel version of the synchronous rectifier, the MOSFET body terminal is normally connected to the inductor in the DC—DC converter and is grounded when an overcurrent condition is detected. In a P-channel version of the synchronous rectifier, the MOSFET body terminal is normally connected to the converter output and is connected to the inductor when an overcurrent condition is detected. In addition, the voltage output by the inductor may be clamped using a zener diode or a snubber capacitor. A MOSFET body bias switching circuit is driven by overcurrent detection circuitry that may also be used to turn off the synchronous rectifier MOSFET gate.

24 Claims, 24 Drawing Sheets

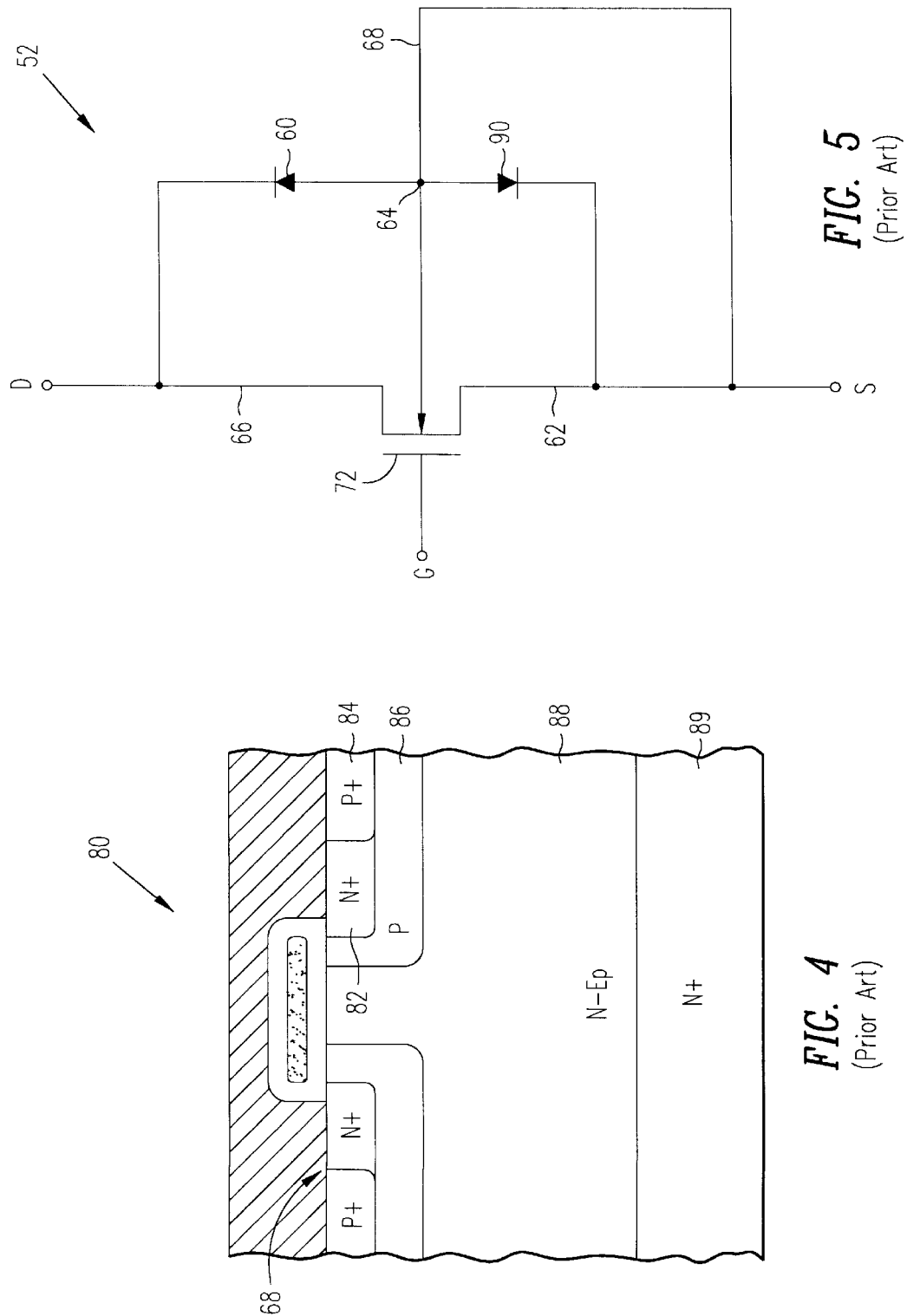

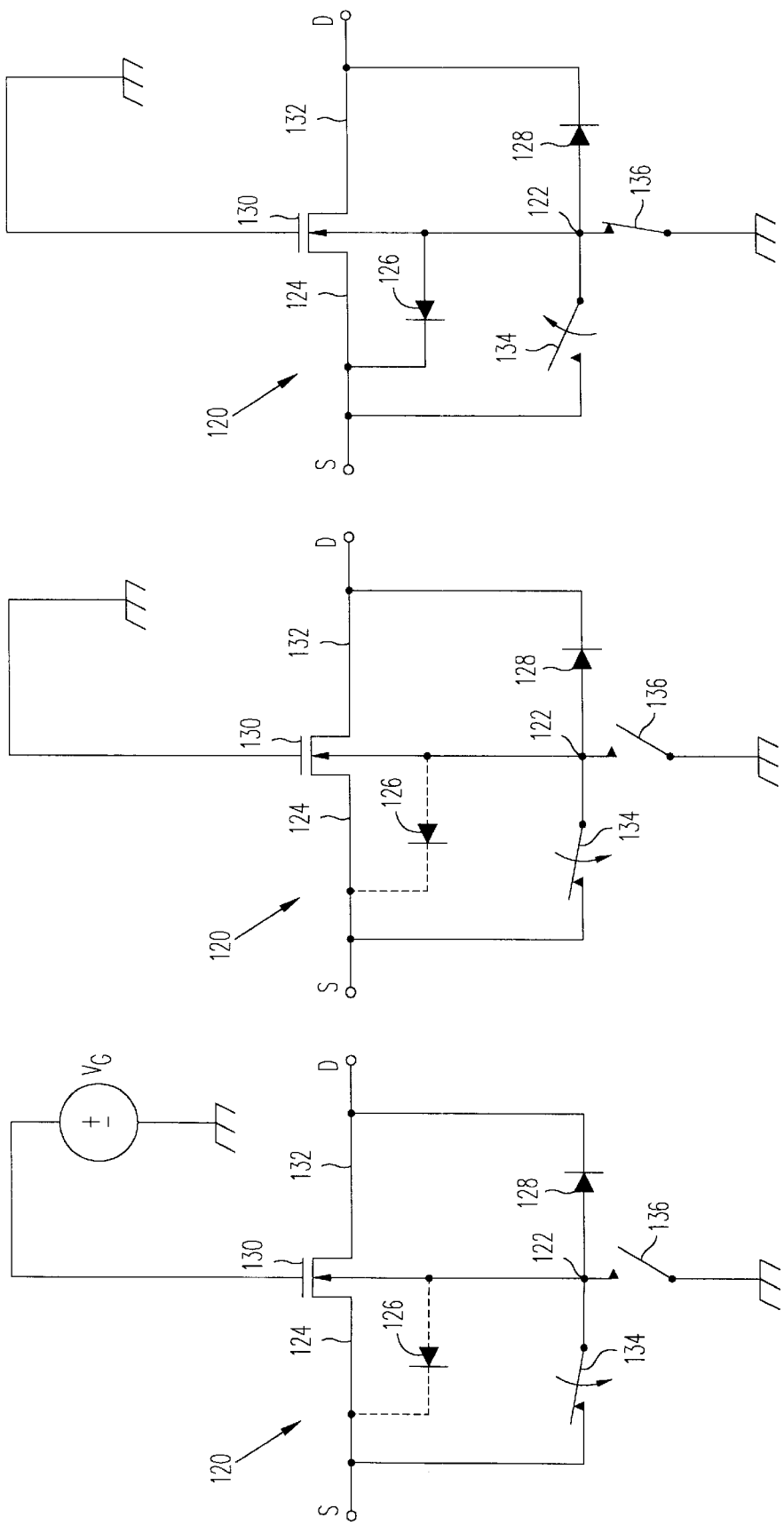

SHORT CIRCUIT PROTECTED DC-DC CONVERTER USING DISCONNECT SWITCHING AND METHOD OF PROTECTING LOAD AGAINST SHORT CIRCUITS

CROSS REFERENCE TO RELATED APPLICATIONS

This application is related to application Ser. No. 08/648,334, filed May 15, 1996, entitled "Pseudo-Schottky Diode", now U.S. Pat. No. 5,818,084, issued Oct. 6, 1998, application Ser. No. 08/648,266, filed May 15, 1996, entitled "Three-Terminal Power MOSFET Switch For Use As Synchronous Rectifier Or Voltage Clamp", now U.S. Pat. No. 5,744,994, issued Apr. 28, 1998, and application Ser. No. 08/649,747 filed May 15, 1996, entitled "Four-Terminal Power MOSFET Switch Having Reduced Threshold Voltage And On-Resistance", now U.S. Pat. No. 5,689,144, issued Nov. 18, 1997, each of which is incorporated herein by reference in its entirety.

FIELD OF THE INVENTION

The field of the invention is solid state DC power sources, particularly switch mode DC/DC converters.

BACKGROUND

The use of high speed switch mode DC/DC converters (switchers) for voltage conversion and regulation in many electronic systems and products has become attractive for reasons including efficiency, power dissipation, thermal management, converter size and weight, battery life, and tight voltage regulation. Gradually switchers have replaced linear regulators in a wide range of applications. The operation of a switch mode power supply is well known in the art, involving the continual switching of current into an inductor-capacitor low pass filter network, whereby feedback is used to control the energy storage rate in an inductor to match load power consumption and thereby to maintain a constant output voltage.

One fault scenario, which must be considered in any switch mode converter's design, is sustained operation in the presence of a shorted load. The impact of a shorted load depends heavily on which converter topology is used. For example FIG. 1 shows a synchronous "buck" converter 10 comprising an input voltage source Vbatt; a low pass filter network 12 having an inductor 14 and a filter capacitor 16; a high-side solid state switch 20; a low-side solid-state switch 22; and an output voltage Vout, which drives a load 25. Buck converter 10 steps down input voltage Vbatt to a lower output voltage Vout. High-side switch 20 can be shut off permanently whenever a shorted load is present, thereby disconnecting input voltage Vbatt from load 25.

A "boost" converter 30, shown schematically in FIG. 2, comprises an inductor 38 connected at one end to an energy source Vbatt and at the other end to a low-side switch 40 and a rectifier diode 34 having a cathode 36, which in turn is connected to a filter capacitor 42 and to a load 32. Current from energized inductor 38 flows through forward-biased rectifier diode 34 to charge filter capacitor 42 and to drive load 32 at an output voltage Vout greater than or equal to Vbatt. The inductor remains inductive (i.e. reactive) as long as its current does not build up to a sufficiently large value that it saturates, whereby it behaves purely resistively, allowing the current to rise rapidly. The current in the inductor is therefore controlled by the on-time of switch 40.

With "boost" converter 30, in the case of a shorted load 32, rectifier diode 34 has a grounded cathode 36, meaning that rectifier diode 34 is always forward biased. This means that the current in inductor 38 is no longer controllable by low-side switch 40. Inductor 38 then saturates, and current eventually builds up to a steady-state value Vbatt/R, where R is the sum of the resistances of the rectifier diode's and inductor's ESR (equivalent series resistance) and any resistance in the "short" itself. Destruction of rectifier diode 34 due to overcurrent heating generally results.

A similar problem occurs in the synchronous boost converter 50 of FIG. 3. A power MOSFET 52 is a synchronous rectifier that replaces a rectifier diode 34 in many power converter circuits. The motivation is primarily one of improved efficiency due to lower conductive- or on-state voltage drop. Another benefit is the capability for high speed operation, since no charge is stored as minority carriers during conduction.

In synchronous boost converter 50, power MOSFET 52 (either N or P-channel) is driven into a low-resistance conductive- or on-state when a low-side N-channel switch 54 is turned off, and the voltage at inductor 38 forces the voltage of an isolated node 58 above the output voltage Vout. Since a normal power MOSFET 52 has an intrinsic antiparallel parasitic diode 60 across its source-to-drain terminals 62, 66, it must be connected in the same orientation as the rectifier diode 34 that it replaces, to prevent loading of output voltage Vout by low-side N-channel switch 54 during normal converter operation. In a boost converter, where output voltage is generally higher than input voltage, this means that the cathode end of parasitic diode 60 is connected to the output terminal, and the anode end to the isolated node 58 connected to inductor 38. In the presence of parasitic diode 60, any shorted load results in unavoidable PN diode current, because the diode's cathode voltage is pulled more negative than its anode voltage. Only by effectively eliminating parasitic diode 60 can the short circuit overcurrent be avoided. In normal operation, however, parasitic diode 60 is beneficial, since it provides a path for the inductor current before MOSFET gate 72 can be turned on (the so-called break-before-make interval typically lasting for tens to hundreds of nanoseconds).

Parasitic diode 60 is a consequence of a sourcebody short 68 inherent in power MOSFETs. By shorting source 62 to the body 64 of power MOSFET 52, the drain 66 to body 64 parasitic diode 60 becomes connected across drain 66 to source 62 terminals of power MOSFET 52 (see FIGS. 4 and 5). In the case of a shorted load 70, parasitic diode 60 becomes forward biased and conducting, even if the power MOSFET gate 72 is turned off. Eventually current rises and power MOSFET 52 is destroyed thermally. The problem occurs for either N-channel or P-channel synchronous rectifier outputs.

Source-body short 68 is shown, for example, in a vertical MOSFET structure 80 illustrated in crosssection in FIG. 4, and shown schematically in FIG. 5. FIG. 4 shows an N+ source 82, a P+ body contact region 84, a P-body 86, which forms the MOSFET structure 80 formed in an N-epitaxial region 88. N-epitaxial region 88 and an N+ substrate 89 form the drain of MOSFET 80. The parasitic body-to-drain diode 60 is shown schematically in FIG. 5. A parasitic source-to-body diode 90 is shorted by the source-to-body short 68. In a normal power MOSFET this results in a diode conducting only in the source-to-drain direction. That is true whether it is a trench MOSFET, a lateral or quasi-vertical MOSFET, or another type of vertical power MOSFET.

What is needed is a means to disconnect a load from an inductor or energy source of a switch mode DC/DC boost converter, that does not increase the on-state power loss in a given size rectifier diode or synchronous rectifier.

SUMMARY

According to the invention, a four-terminal MOSFET is used to block short circuit load current in a synchronous boost converter. A four-terminal MOSFET is described in U.S. patent application Ser. No. 08/649,747 now U.S. Pat. No. 5,689,144, issued Nov. 18, 1997, and has separate terminals for its source, drain, body and gate, no combination of which are permanently connected together. The body terminal of the four-terminal MOSFET is biased to eliminate the forward biasing of a parasitic diode within the MOSFET. For example, in an NMOS rectifier embodiment, the MOSFET body is normally connected to the inductor and is grounded only when an overcurrent condition is detected. In a second embodiment, the inductor's maximum voltage is clamped to a maximum value. In a third embodiment, a four-terminal PMOS synchronous rectifier has a body terminal that is normally connected to the converter output and is connected to the inductor only when an overcurrent condition is detected. In a fourth embodiment, a MOSFET body bias switching circuit is driven by the same detection circuitry used to turn off the synchronous rectifier MOSFET gate.

BRIEF DESCRIPTION OF THE DRAWINGS

FIG. 4 illustrates in cross-section the structure of a vertical MOSFET having an internal source-to-body short circuit, resulting in a drain-to-source parasitic antiparallel diode.

FIG. 5 schematically illustrates the structure of the vertical MOSFET shown in cross-section in FIG. 4.

FIG. 8*a* schematically illustrates an NMOSFET in accordance with the invention during its on-state synchronous rectifier mode.

FIG. 8*b* schematically illustrates an NMOSFET in accordance with the invention during its off state, break before make operation.

FIG. 8*c* schematically illustrates an NMOSFET in accordance with the invention during its off state, short-circuit disconnect mode.

DETAILED DESCRIPTION OF THE EMBODIMENTS

Figure 1:
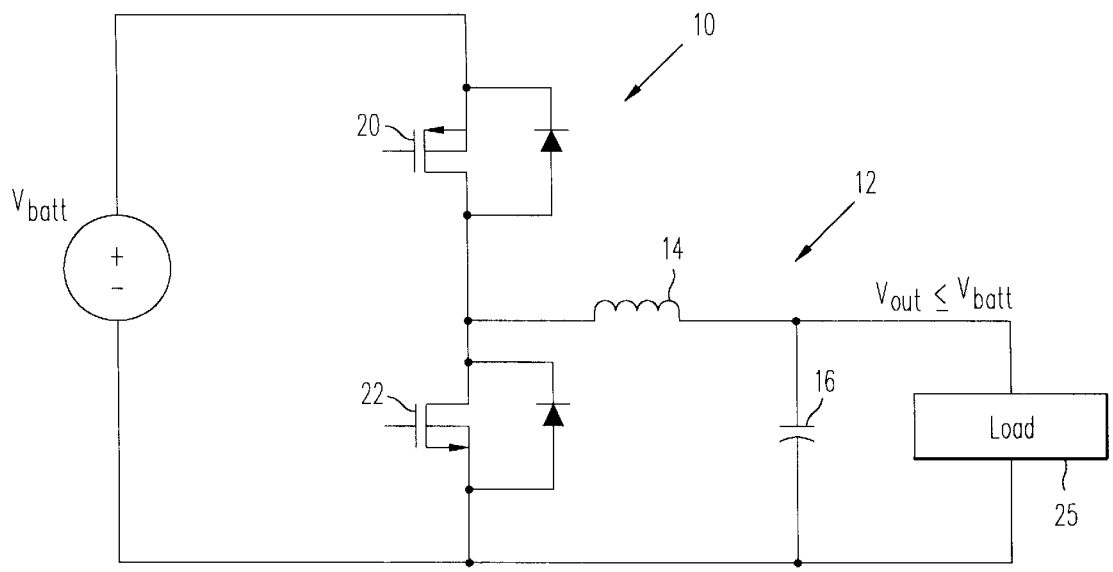
FIG. 1 schematically illustrates a switch mode "buck" converter in accordance with prior art.
Figure 2:
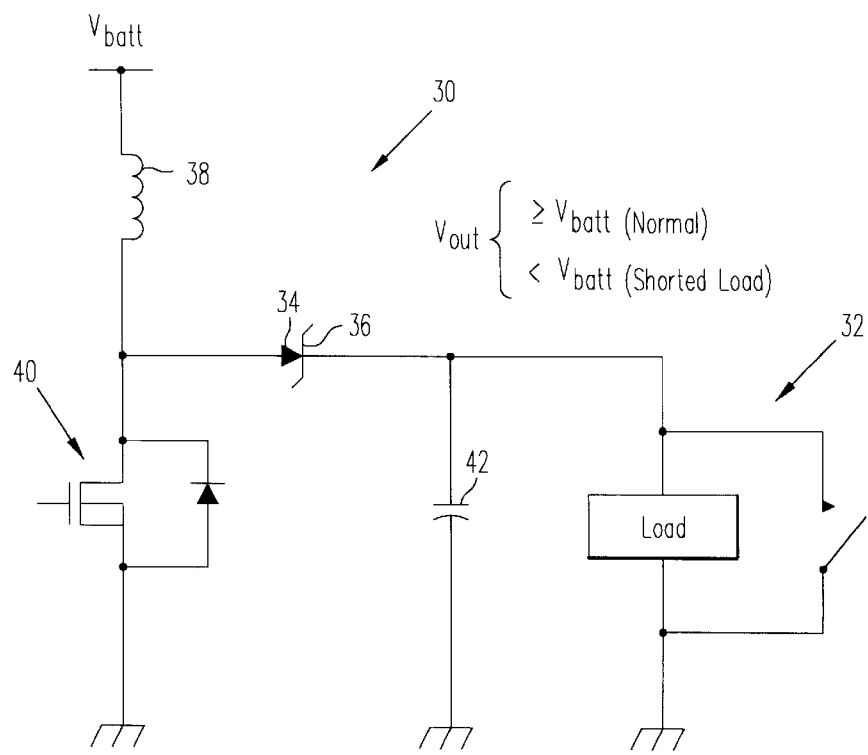
FIG. 2 schematically illustrates a synchronous switch mode "boost" converter in accordance with prior art.
Figure 3:
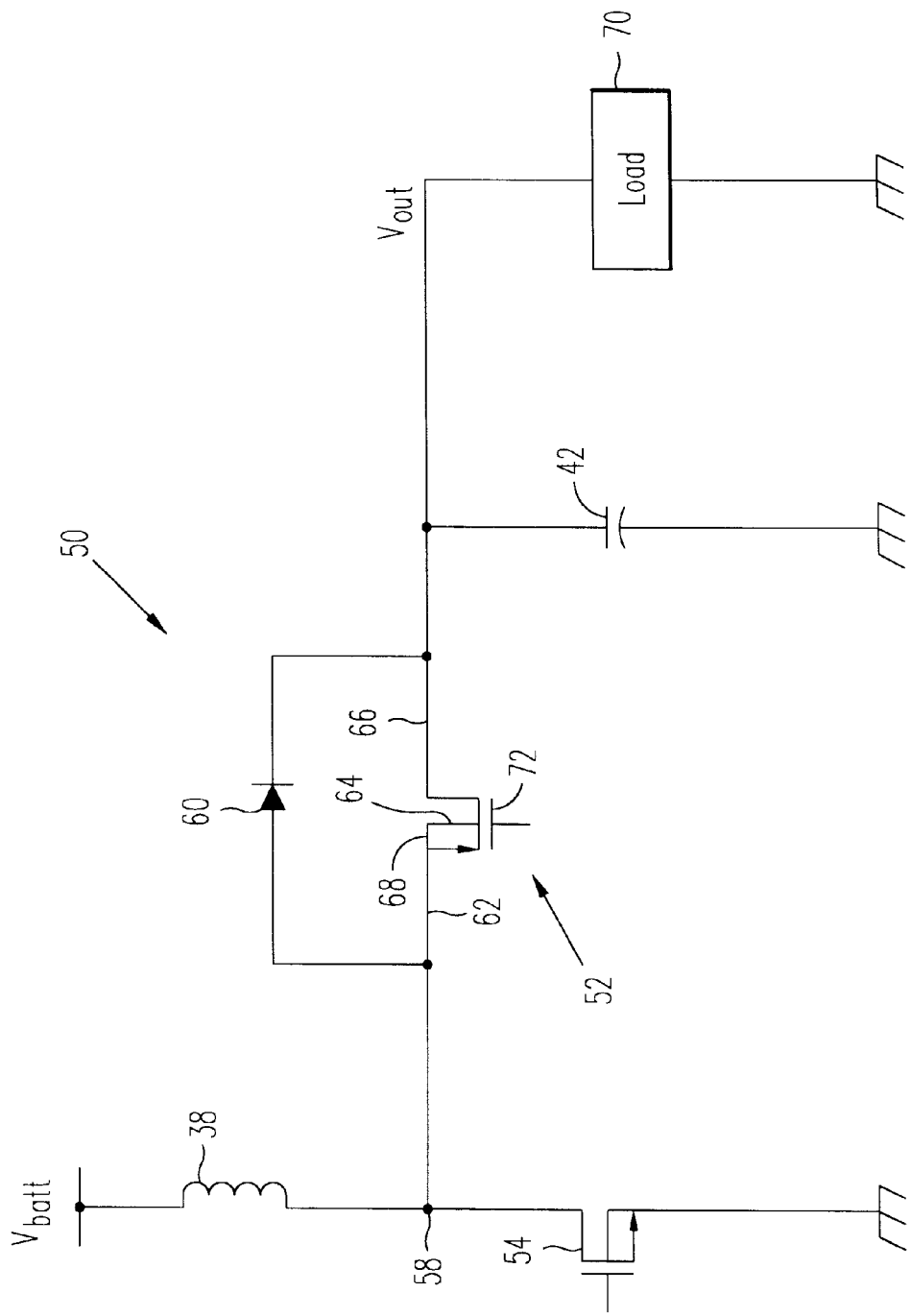
FIG. 3 schematically illustrates a synchronous boost converter incorporating a power MOSFET in accordance with prior art.
Figure 6:
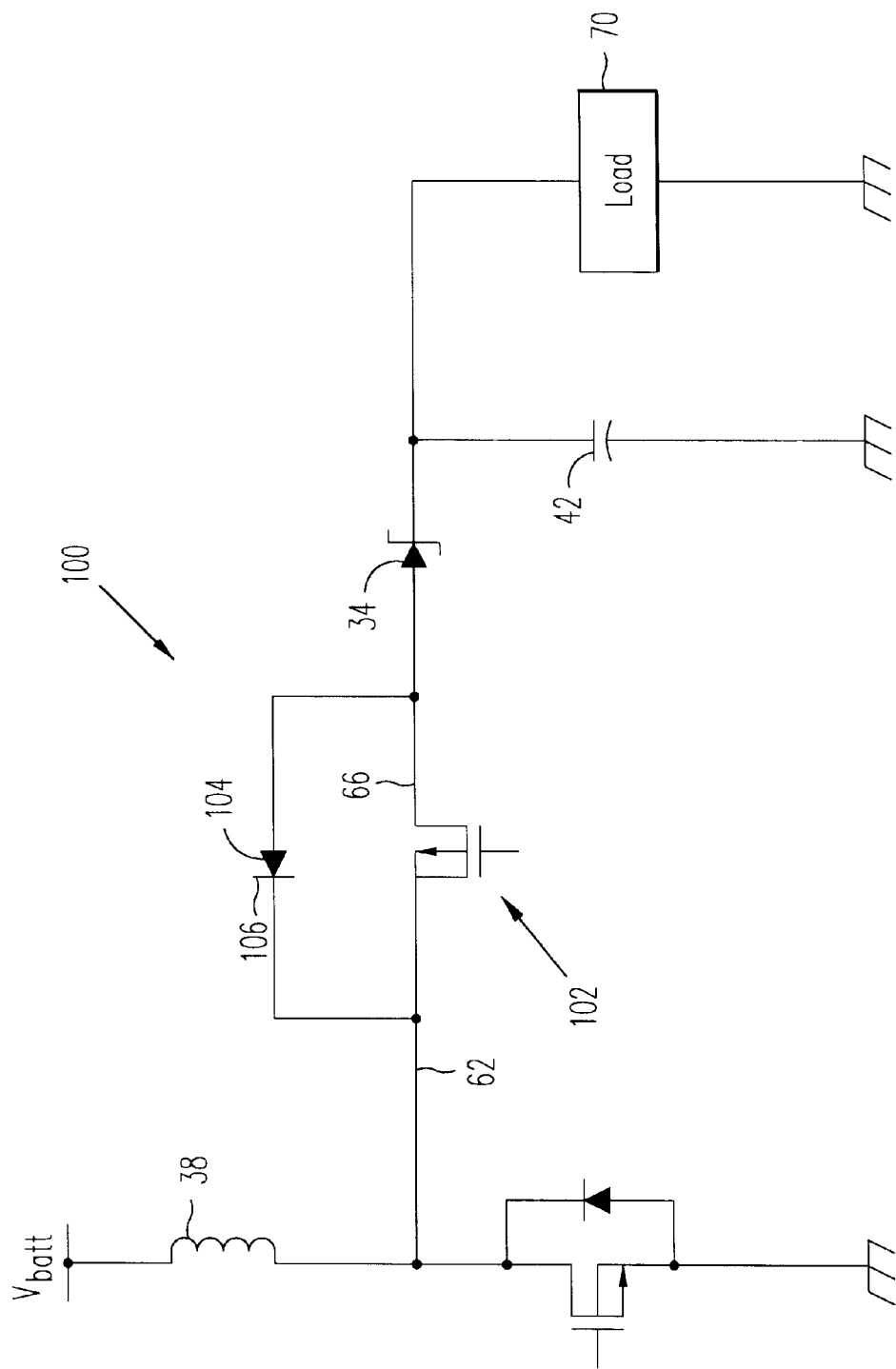
FIG. 6 schematically illustrates the use of a series pass element to block short circuit overcurrent in a boost converter.

Forward-biasing of a diode is uncontrollable when only a single synchronous power MOSFET 52 or a rectifier diode 34 is used (see FIGS. 2 and 3). In one approach to this problem a series pass element is added to facilitate overcurrent shutoff. This approach is shown in the boost converter 100 of FIG. 6, wherein a P-channel MOSFET (PMOS) 102 is series-connected with rectifier diode 34. Since PMOS 102 is connected with its source 62 (i.e. the cathode 106 of its antiparallel parasitic diode 104) connected to inductor 38 rather than to load 70, then shutting off PMOS 102 disconnects load 70 completely from the power source Vbatt at the converter's input. However, this solution involves a higher cost than does the synchronous boost converter 50 shown in FIG. 3, because both a MOSFET and a diode are required to perform the functions of a rectifier and a disconnect switch. Moreover, the voltage drop across the series combination of rectifier diode 34 and PMOS 102 is higher than across rectifier diode 34 alone, resulting in loss of efficiency and increased power dissipation during normal converter operation.

Figure 7:
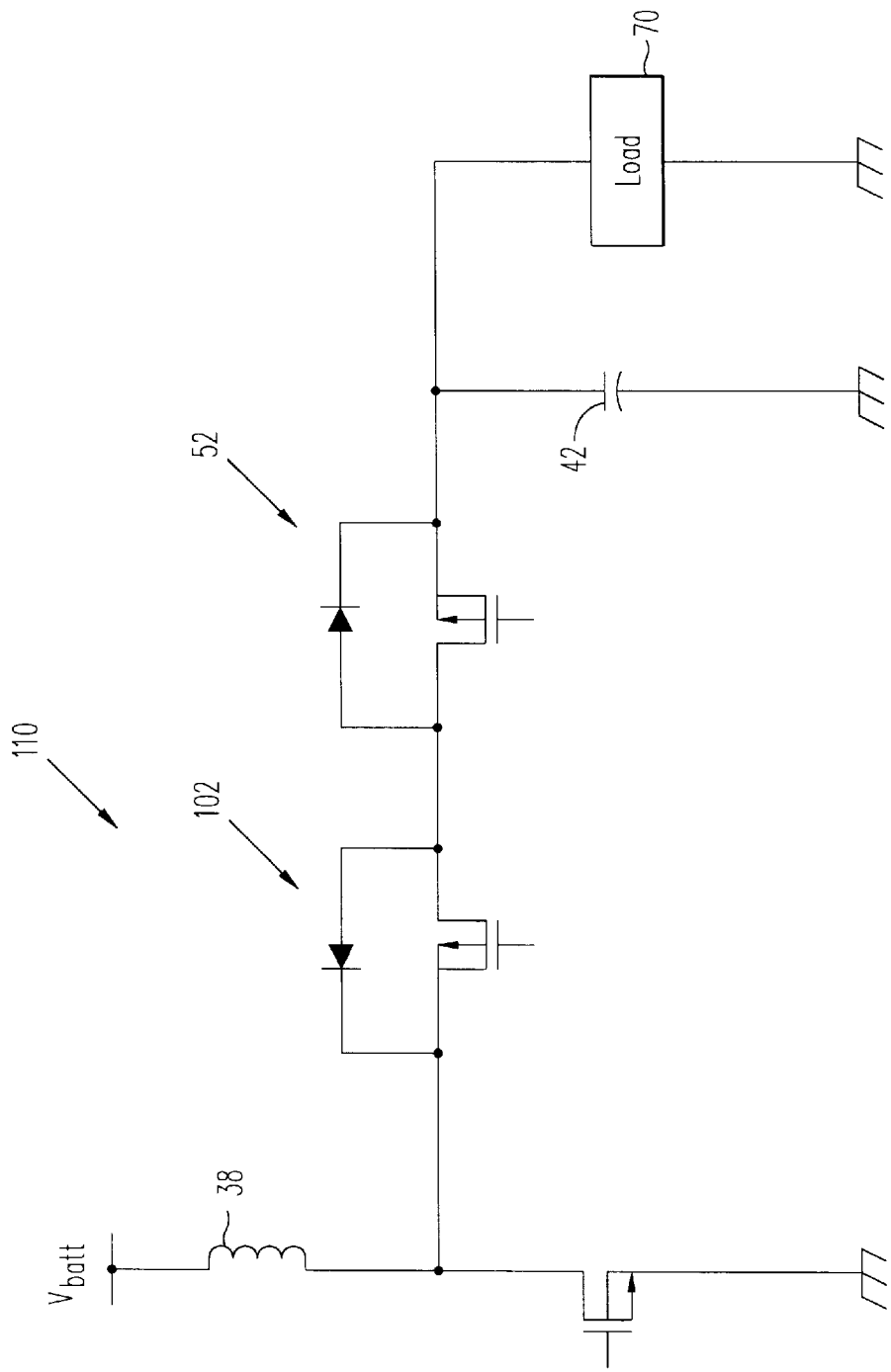
FIG. 7 schematically illustrates the use of bidirectionally connected MOSFETs to disconnect the load in a synchronous boost converter.

In an alternative approach this voltage drop can be decreased somewhat by replacing rectifier diode 34 by a second power MOSFET 52 as in a boost converter 110 shown in FIG. 7. The back-to-back MOSFETs 102, 52 form an AC switch capable of bi-directional blocking or conduction. However, the cost of such a solution is four times higher than that of a single MOSFET switch solution. Since two series MOSFETs double the resistance, the size of each MOSFET must be doubled to recover the original resistance of a single MOSFET.

An embodiment in accordance with the disclosed invention employs a four-terminal power MOSFET, of any physical construction (lateral, vertical, quasivertical) to implement a synchronous rectifier capable of switching the body diode from forward to reverse bias as needed in an overcurrent fault condition without compromising normal operation. A four-terminal MOSFET, described in the above-referenced U.S. patent application Ser. No. 08/649,747, now U.S. Pat. No. 5,689,144, issued Nov. 18, 1997, has separate terminals for source, drain, body and gate. The body and gate terminals may be driven synchronously, such that the body is partially forward-biased with respect to the electrical source when the gate is driven, so as to turn the MOSFET on, i.e., the forward-bias is at a level (e.g., 0.5 V) that is not sufficient to cause a significant forward current to flow through the PN junction between the body and electrical source. When the power MOSFET is turned off, the body may be shorted to the electrical source, so as to minimize the leakage current in the off state. (As used herein, the "source" is the more negative of the source/drain terminals in an N-channel device and the more positive of the source/drain terminals in a P-channel device, assuming that the device is connected in a normal manner).

The operating states of a four-terminal MOSFET 120 are illustrated schematically in FIG. 8a–8c. In FIGS. 8a and 8b the MOSFET body 122 is tied to its source 124 so that an intrinsic source-to-body diode 126 is shorted by a source-to-body switch 134, leaving an intrinsic body-to-drain diode 128 functioning as an antiparallel diode. When a drive signal is applied to the MOSFET gate 130 as in FIG. 8a, current flows through the MOSFET channel as majority carriers (synchronous rectifier mode). During break-before-make operation the configuration shown in FIG. 8b allows current to flow through body-to-drain diode 128, because the potential of source 124 is more positive than that of drain 132, although gate 130 is biased off (grounded) and the channel of MOSFET 120 therefore conducts no current. During intervals when inductor 38 (see FIG. 2) is being energized (i.e. current is building up in it), four-terminal MOSFET 120 is configured as shown in FIG. 8b. The drive signal is removed from MOSFET gate 130 so that no current flows through the channel of four-terminal MOSFET 120, and source 124 is more negative than drain 132, so that body-to-drain diode 128 is reverse-biased and therefore also conducts no current. In a shorted load condition as shown in FIG. 8c, overcurrent through intrinsic diode 128 is blocked by opening source-to-body switch 134 and grounding MOSFET body 122 through a grounding switch 136, so that intrinsic diode 128 is now reverse-biased and therefore non-conducting. Gate 130 is likewise grounded, so that the channel of MOSFET 120 is also non-conducting.

Figure 9A:
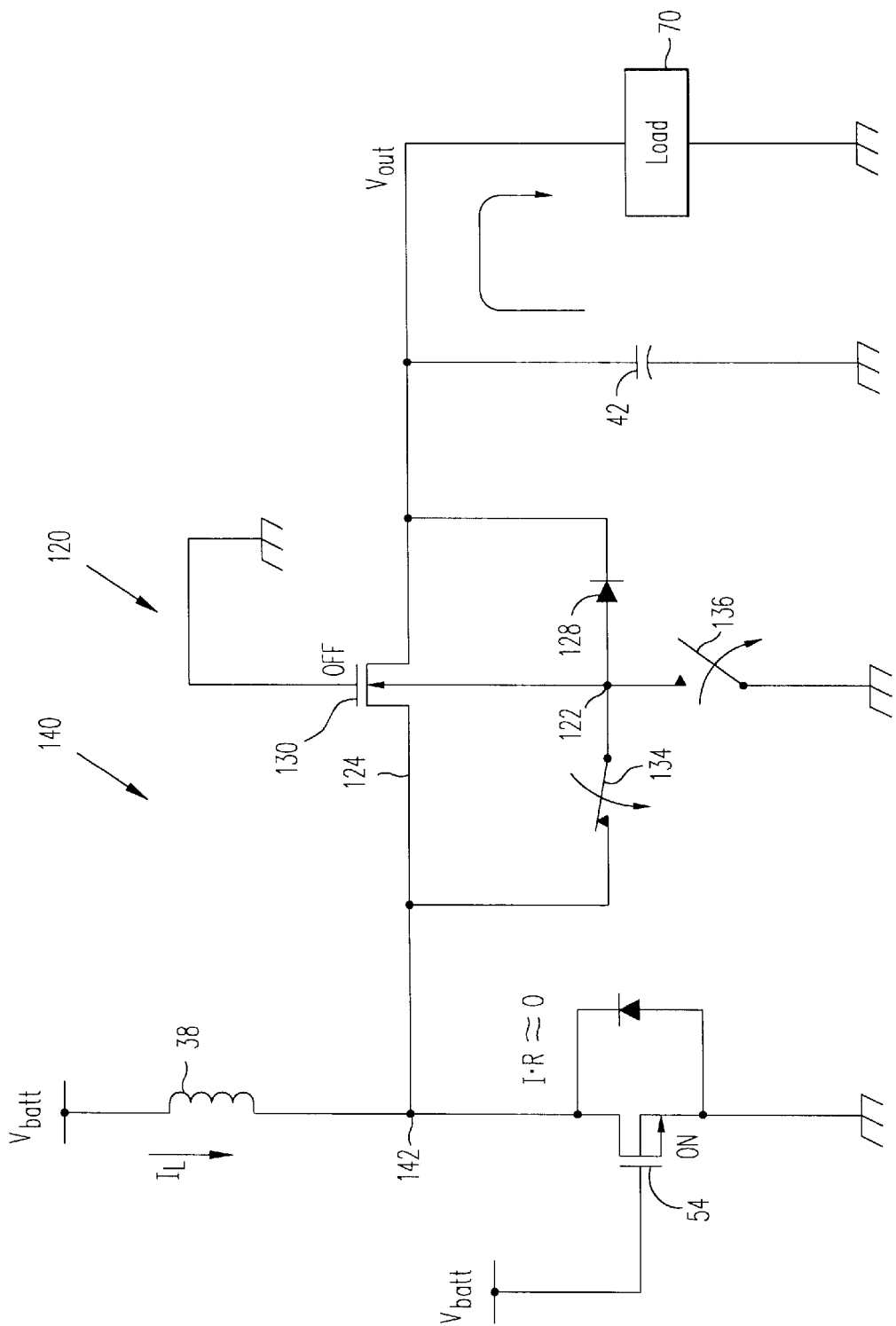
FIG. 9*a* schematically illustrates a boost converter with a disconnect NMOSFET during normal operation, in its inductor energizing mode.

FIGS. 9a–9d schematically illustrate an operational sequence of a boost converter 140 incorporating a four-terminal MOSFET 120 as a synchronous rectifier. In FIG. 9a, inductor 38 is energized, low-side N-channel switch 54 is turned on, and the gate of four-terminal MOSFET 120 is biased in an off-state (see FIG. 8b). MOSFET gate 130 may be tied either to ground (as shown) or to source 124. MOSFET body 122 is tied through source-to-body switch 134 to inductor 38, and body grounding switch 136 is open. A current $I_L$ flows through low-side N-channel switch 54, and the voltage at a triple point or node 142 is pulled down nearly to ground. Therefore, if any output voltage Vout is present, body-to-drain diode 128 within four-terminal MOSFET 120 is reverse-biased and hence non-conducting. Filter capacitor 42 maintains current to load 70 in this operating mode.

Figure 9B:
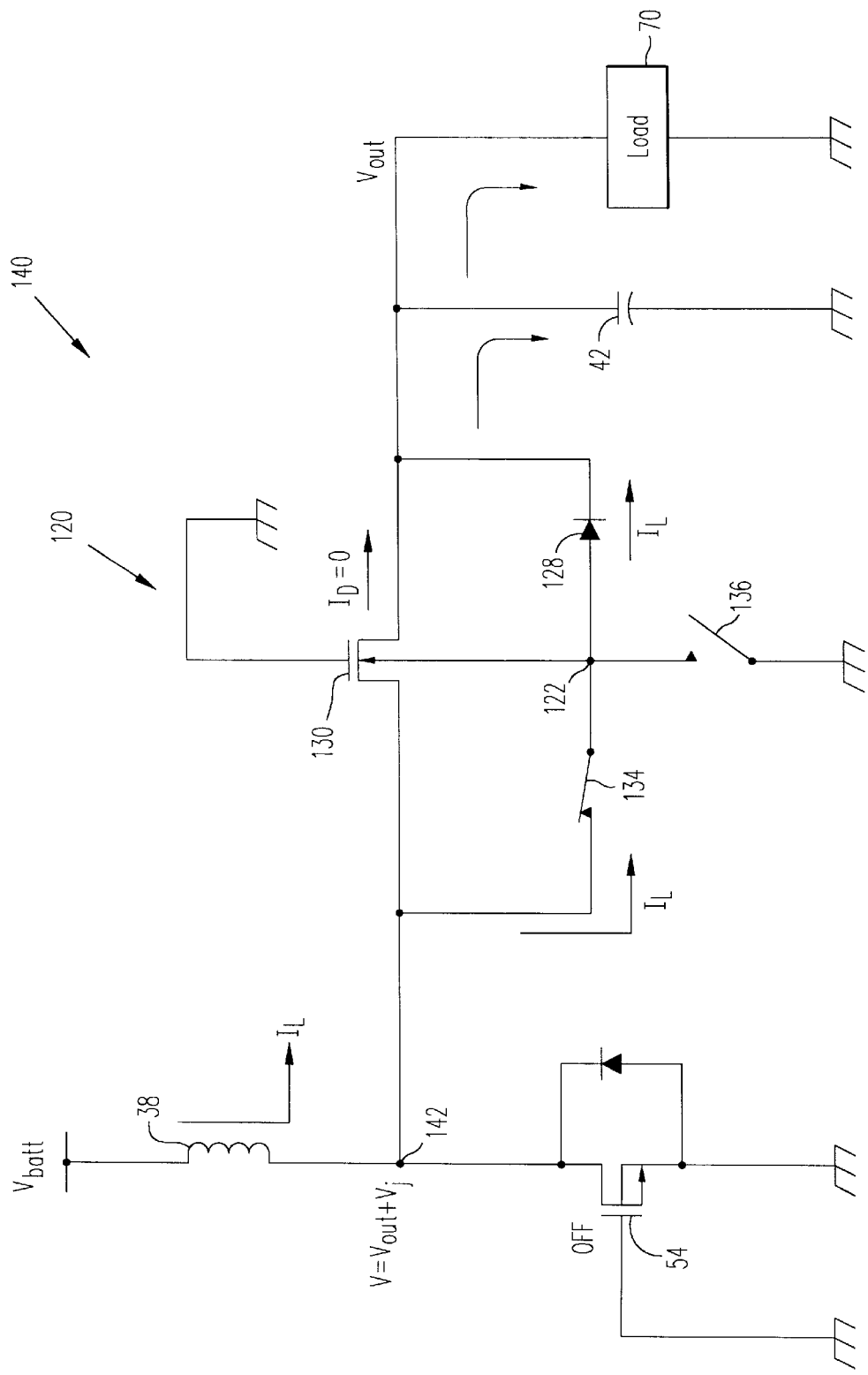
FIG. 9*b* schematically illustrates a boost converter with a disconnect NMOSFET during normal operation, in its break-before-make mode.

In FIG. 9b, the respective gates of both four-terminal MOSFET 120 and low-side N-channel switch 54 are biased off (break-before-make) to avoid simultaneous MOSFET conduction ("shoot through"). The voltage at node 142 increases suddenly to a value equal to the output voltage Vout plus a voltage drop $V_J$ across intrinsic body-to-drain diode 128, which is now forward-biased. Current $I_L$ from inductor 38 flows through body-to-drain diode 128 with four-terminal MOSFET 120 still biased in the off-state and non-conducting, as shown in FIG. 8b.

Figure 9C:
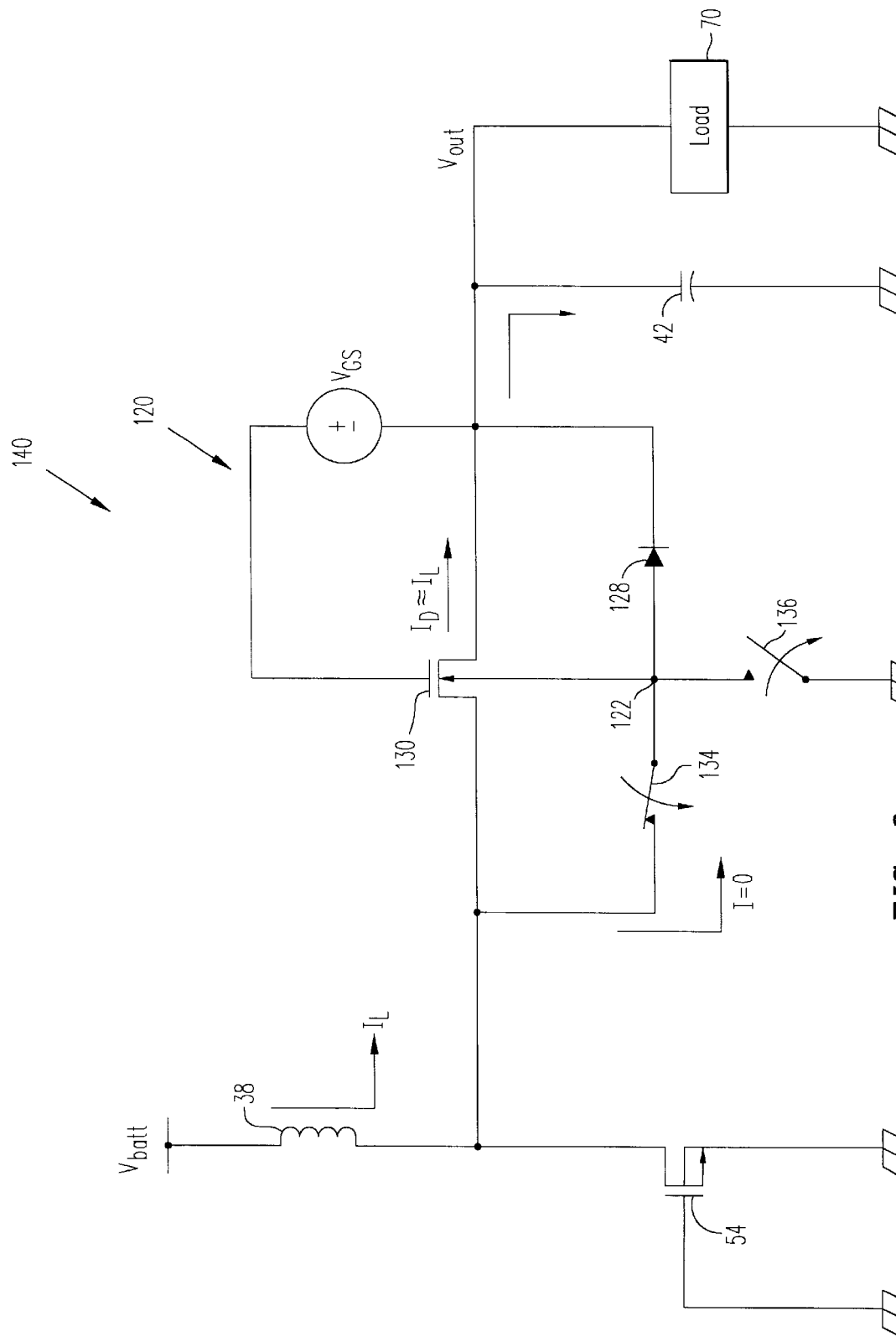
FIG. 9*c* schematically illustrates a boost converter with a disconnect NMOSFET during normal operation, in its synchronous rectifying mode.

In FIG. 9c, four-terminal MOSFET 120 is biased in the on-state by applying a potential to MOSFET gate 130 higher than output voltage Vout by at least 4 to 5 volts to ensure turn-on of four-terminal MOSFET 120. Alternatively, the gate drive voltage may be referenced to ground or directly to MOSFET source 124 (as shown). Since the channel of four-terminal MOSFET 120 is now conducting, current flows primarily through the channel of four-terminal MOSFET 120, and very little current flows through body-to-drain diode 128. The voltage drop across four-terminal MOSFET 120 is Rds*I, where Rds is the source-to-drain equivalent resistance and I is the current through four-terminal MOSFET 120. This may be inadequate voltage across body-to-drain diode 128 to make it fully conducting, even though diode 128 is forward biased.

FIGS. 9a–9c depict a normal sequence of operation of boost converter 140, wherein the inductor-energizing operating state of FIG. 9a (low-side N-channel switch 54 on, four-terminal MOSFET 120 off) is followed by the break-before-make operating state of FIG. 9b (both low-side N-channel switch 54 and four-terminal MOSFET 120 off), followed by the synchronous rectification operating state of FIG. 9c (low-side N-channel switch 54 off, four-terminal MOSFET 120 on), then back to the break-before-make operating state of FIG. 9b, followed by the inductor-energizing operating state of FIG. 9a. This sequence is repeated, with feedback regulation of output voltage by controlling the relative timing of the operating states illustrated in FIGS. 9a–9c. In each of the above states, switch 134 is closed, shorting body 122 to source 124 of four-terminal MOSFET 120.

Figure 9D:
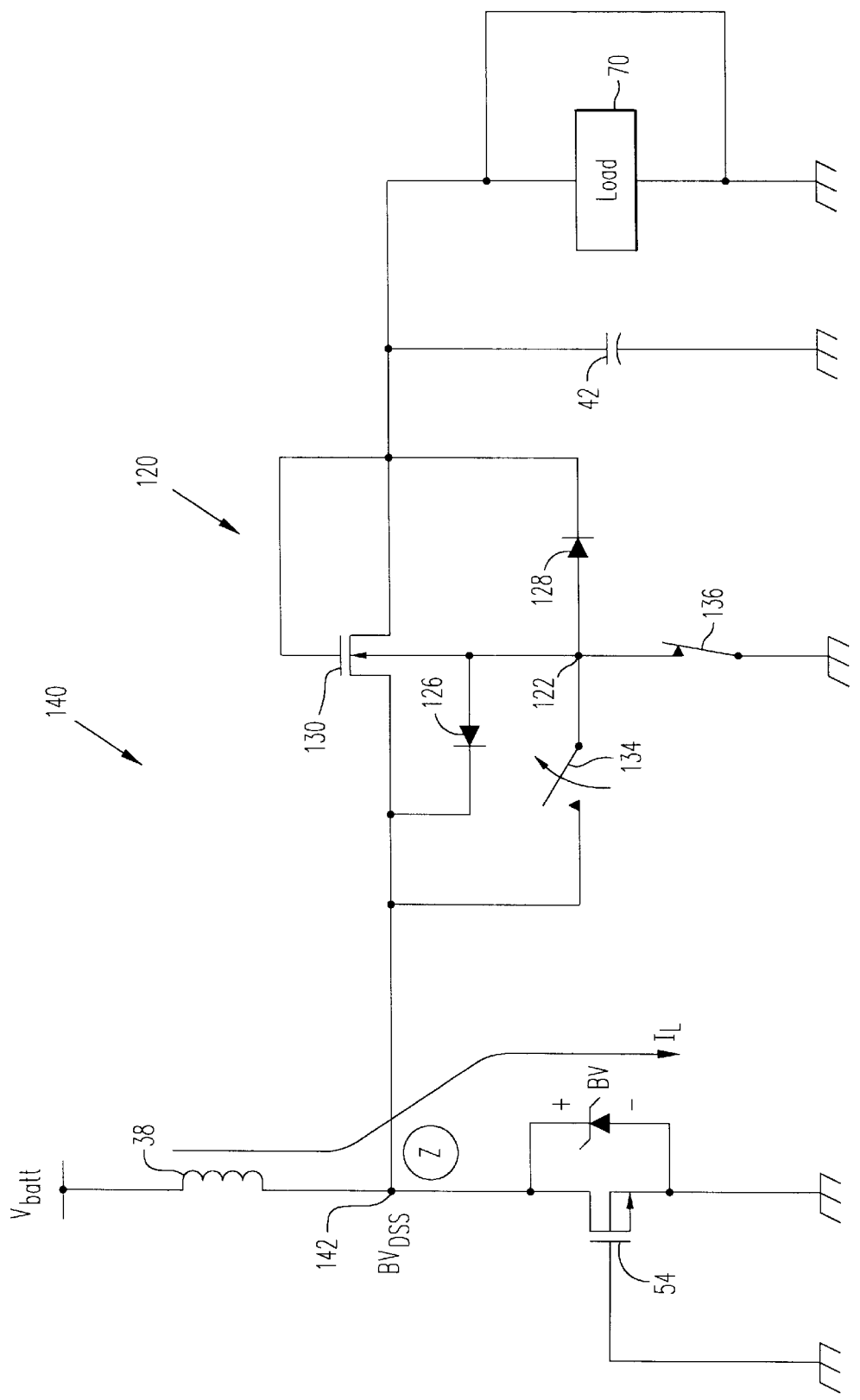
FIG. 9*d* schematically illustrates a boost converter operation with a disconnect NMOSFET during shorted load, disconnect operation.

In FIG. 9d a shorted load 70 occurs, and switches 134, 136 are toggled to open the source-body short and to ground body 122 of four-terminal MOSFET 120, reverse-biasing both intrinsic diodes 126, 128. Meanwhile the gate 130 of MOSFET 120 is grounded, disconnecting all current through the channel of MOSFET 120 to output Vout. However, the disconnected inductor voltage at node 142 now rises to maintain continuous conduction by driving low-side N-channel switch 54 into avalanche breakdown or until diode 126 intrinsic to MOSFET 120 avalanches, whichever one breaks down first. The voltage at node 142 clamps at a value BVdss, the lower of the respective avalanche breakdown voltages of low-side N-channel switch 54 or diode 126. The switch configuration is that shown in FIG. 8c. If both MOSFET 54 and MOSFET 120 are designed to repeatedly survive avalanche, then the maximum voltage can be set by the diode internal to either one of the MOSFETS. Otherwise, a voltage clamp must be used to limit the voltage excursion at node 142. The structure of the four-terminal MOSFET 130 may cause it to be less robust than MOSFET 54 with its source/body shorts.

Figure 10B:
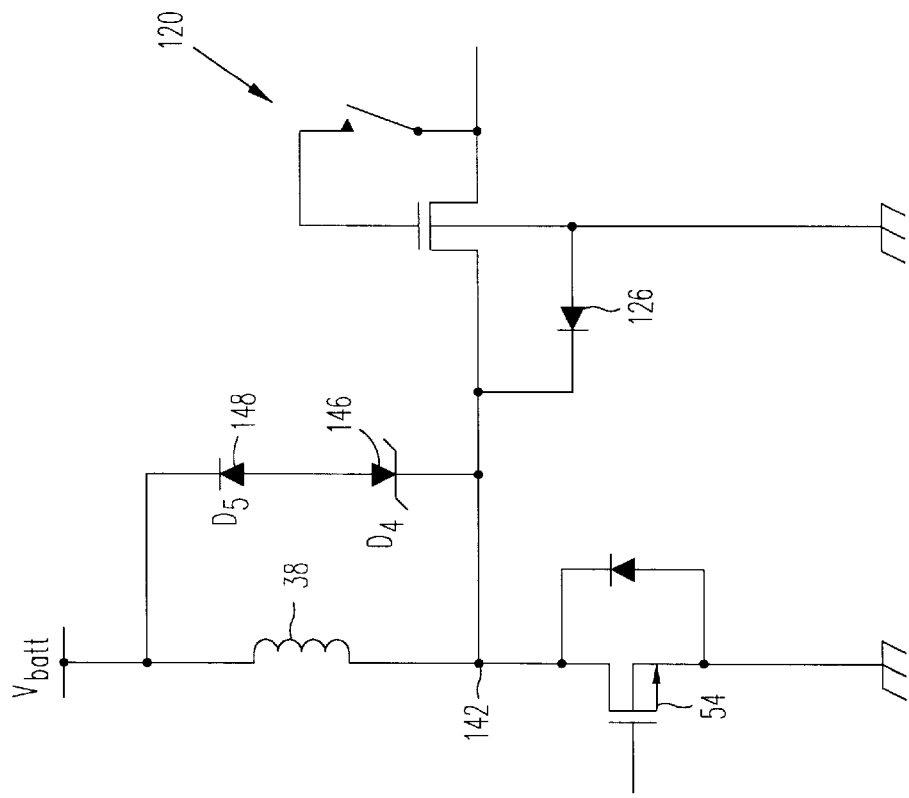
FIG. 10*b* schematically illustrates the clamping of the inductor voltage during overcurrent disconnect using a flyback zener diode across the inductor terminals.
Figure 10A:
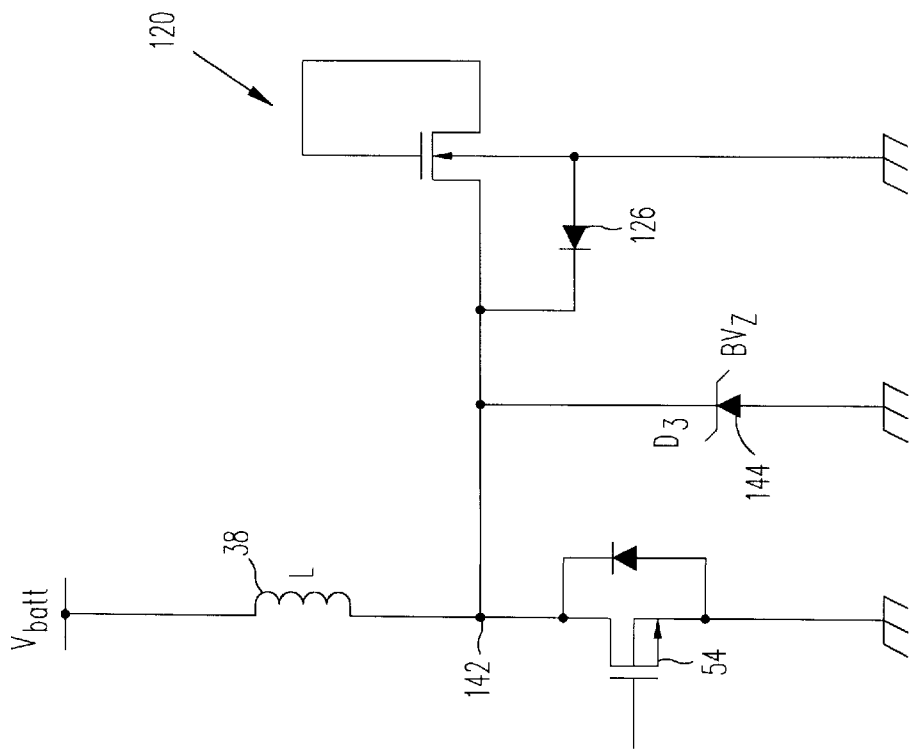
FIG. 10*a* schematically illustrates the clamping of the inductor voltage during overcurrent disconnect using a grounded zener diode.
Figure 10C:
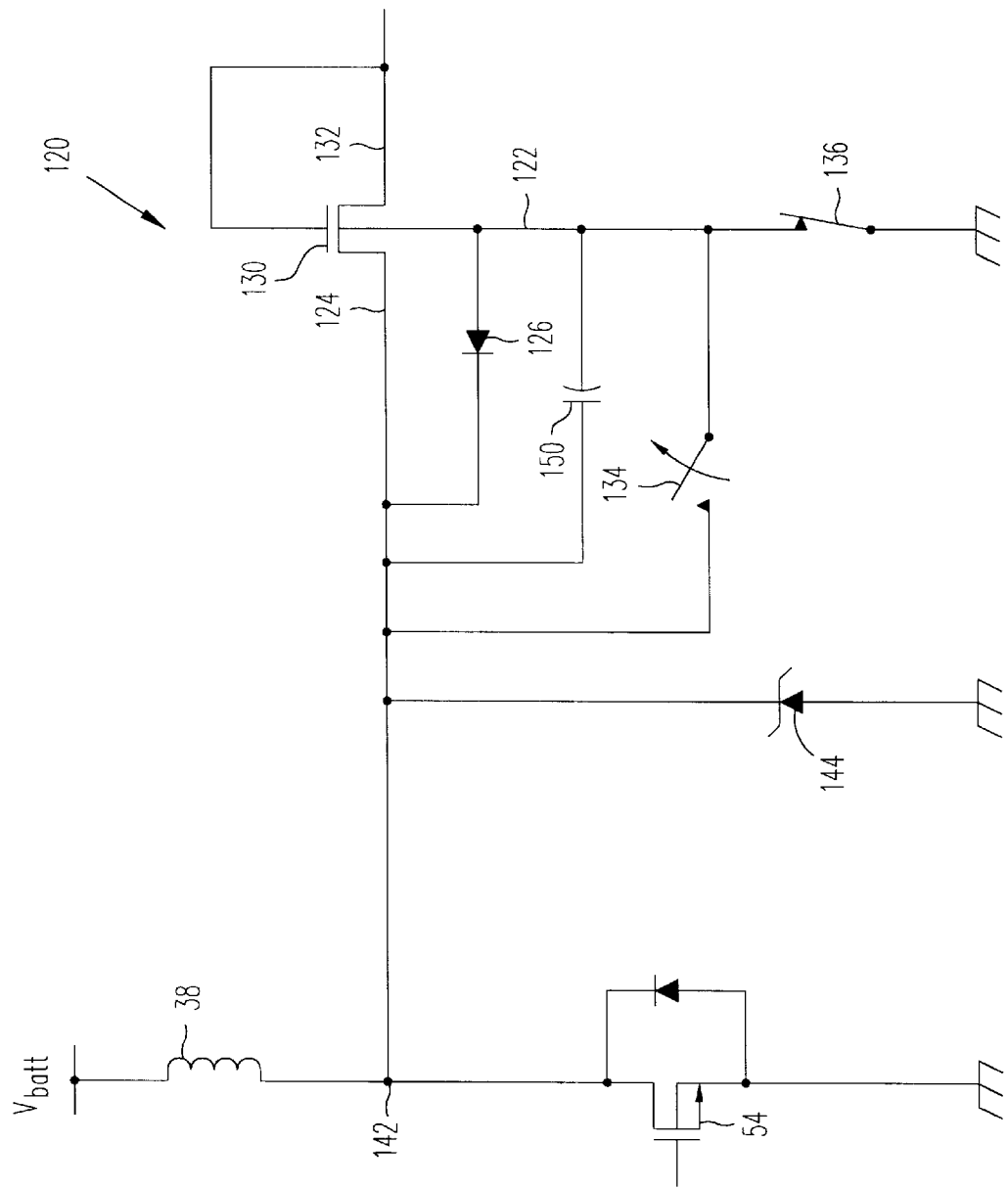
FIG. 10*c* schematically illustrates the clamping of the inductor voltage during overcurrent disconnect facilitated by a snubber capacitor.

FIGS. 10a–10c illustrate three methods to limit the voltage swing at node 142, aside from driving low-side N-channel switch 54 into breakdown. In FIG. 10a, a grounded zener diode 144 is connected in parallel with low-side N-channel switch 54 to clamp the voltage at node 142 to BVz instead of BVdss and thereby protect low-side N-channel switch 54 from breaking down (assuming zener breakdown voltage BVz is chosen to be lower than BVdss.

In FIG. 10b, a zener diode 146 clamps the maximum voltage across inductor 38, thus limiting the maximum voltage at node 142. A series diode 148 is added to block conduction through zener diode 146 during normal operation.

In FIG. 10c, a snubber capacitor 150 is connected in parallel with source-to-body switch 134. In normal operation snubber capacitor 150 is shorted through source-to-body switch 134 and therefore does not affect efficiency, because it is eliminated from the circuit. However, in a shorted load condition, when source-to-body switch 134 is open, and body 122 of four-terminal MOSFET 120 is grounded through grounding switch 136, snubber capacitor 150 becomes grounded in parallel with low-side N-channel switch 54, where it filters peak voltage spikes and absorbs energy delivered from inductor 38.

Figure 11A:
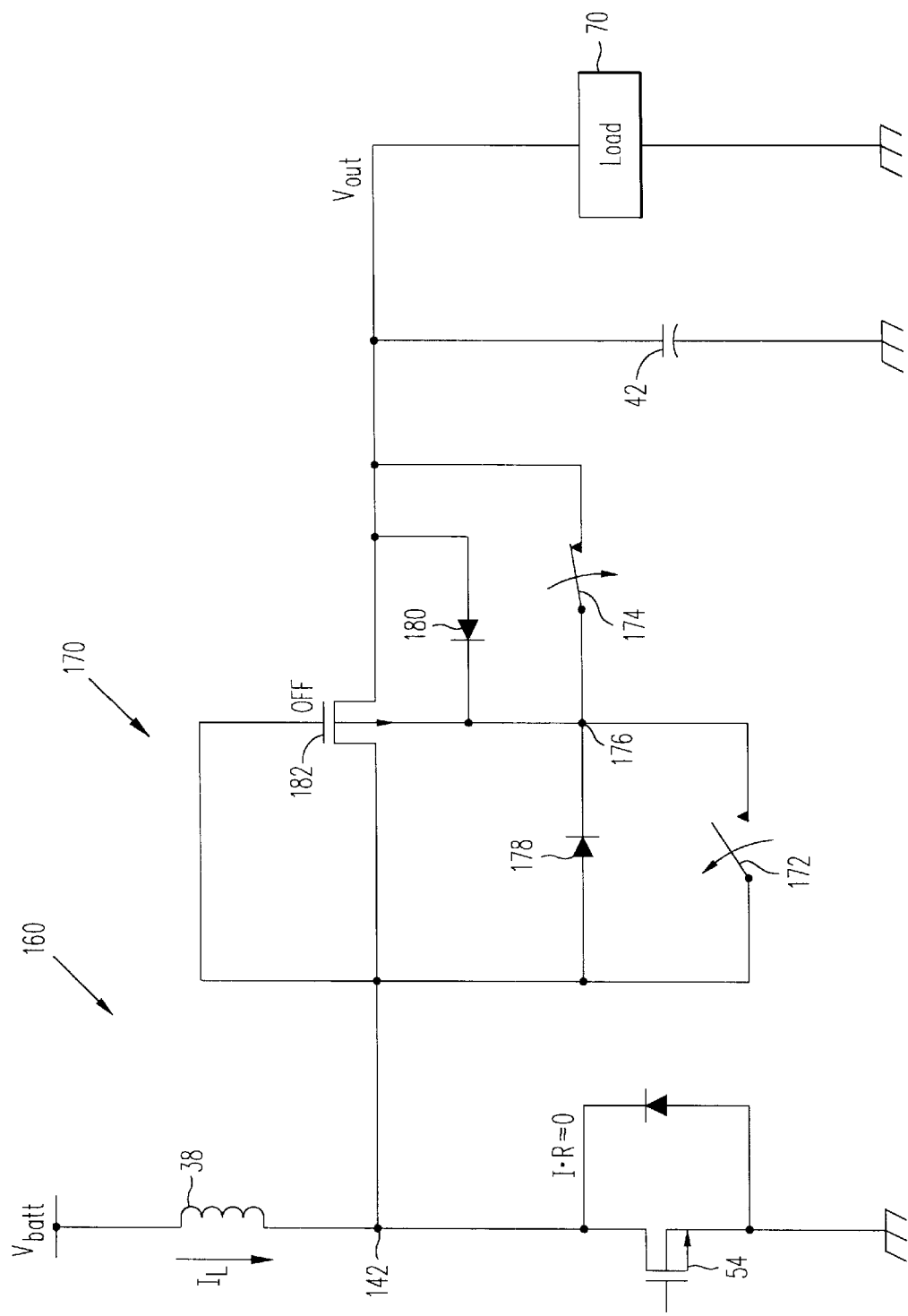
FIG. 11*a* schematically illustrates a boost converter with disconnect PMOSFET during normal operation, in its inductor energizing mode.
Figure 11B:
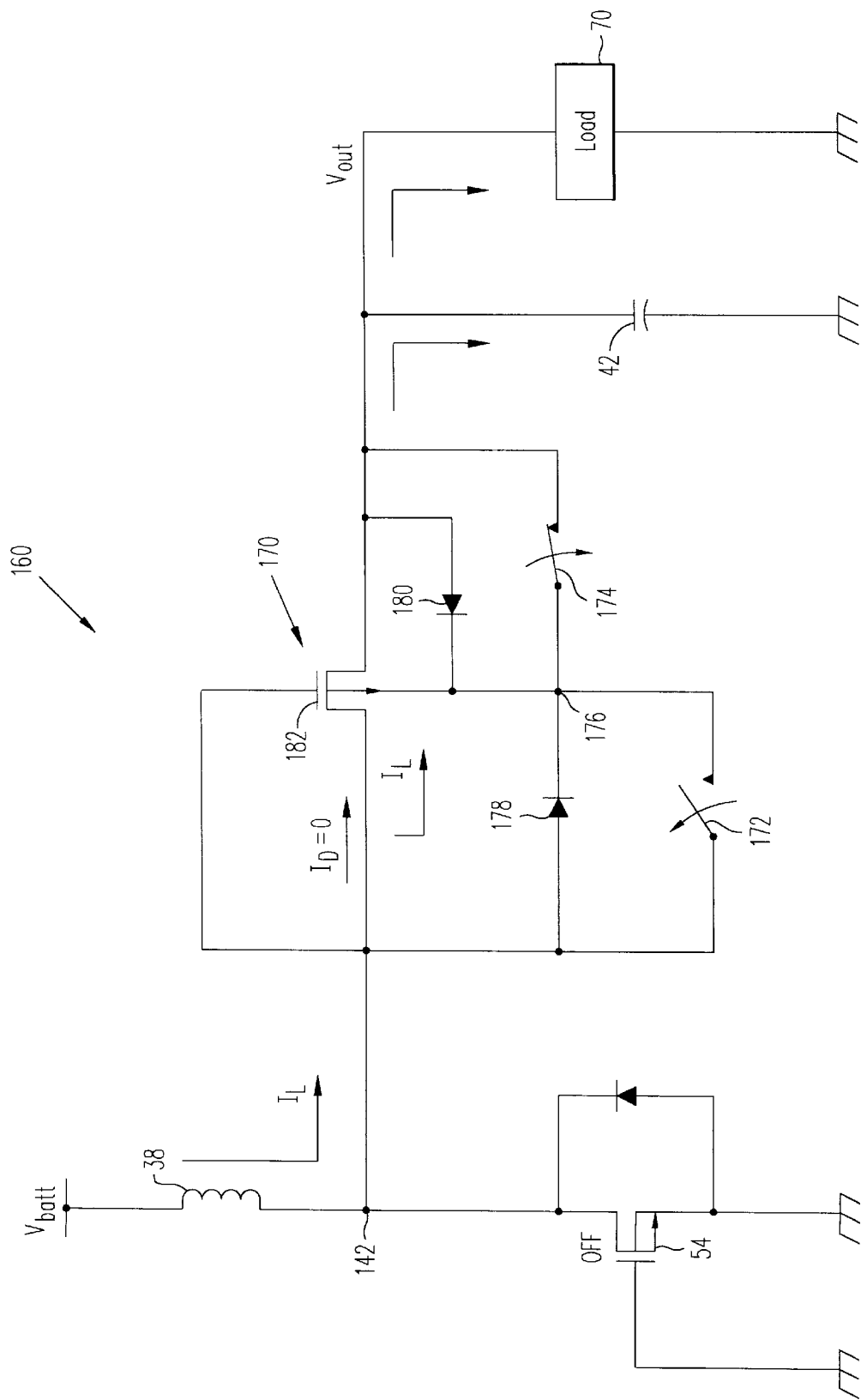
FIG. 11*b* schematically illustrates a boost converter with disconnect PMOSFET during normal operation, in its break before make mode.
Figure 11C:
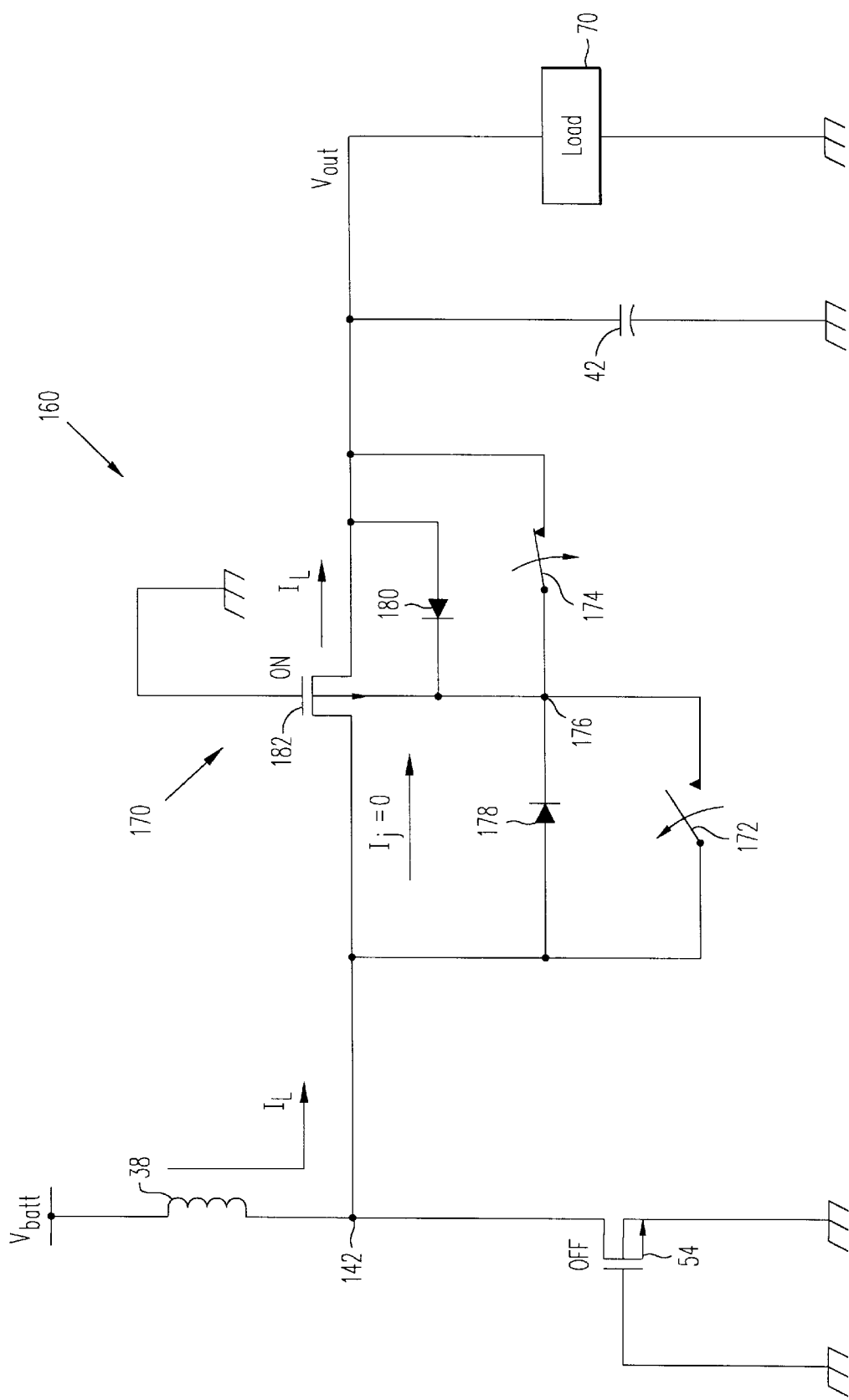
FIG. 11*c* schematically illustrates a boost converter with disconnect PMOSFET during normal operation, in its synchronous rectifying mode.

FIGS. 11a–11d illustrate a P-channel synchronous boost converter 160 incorporating a four-terminal P-channel MOSFET 170 having two switches 172, 174 connected body-to-source and body-to-drain, respectively. During normal operation the body 176 of four-terminal P-channel MOSFET 170 is connected to the output Vout, such that the anode of an intrinsic source-to-body diode 178 is connected to inductor 38. In FIG. 11a, low-side N-channel switch 54 is turned on, and inductor 38 is energized; four-terminal P-channel MOSFET 170 is turned off by biasing its gate 182 to Vout, which is the highest available potential in boost converter 160. Under these conditions intrinsic diode 178 is reversed biased and therefore non-conducting. FIG. 11b, low-side N-channel switch 54 is turned off, and break-before-make conduction occurs through intrinsic diode 178, which is now forward biased. Four-terminal P-channel MOSFET 170 remains turned off by switching its gate 182 to node 142, which is now the highest potential is boost converter 160. In FIG. 11c, low-side N-channel switch 54 remains turned off, and synchronous rectification occurs by conduction through four-terminal P-channel MOSFET, which is turned on by switching its gate 182 from node 142 to ground or to any other potential 1 V to 2 V more negative than Vbatt.

Figure 11D:
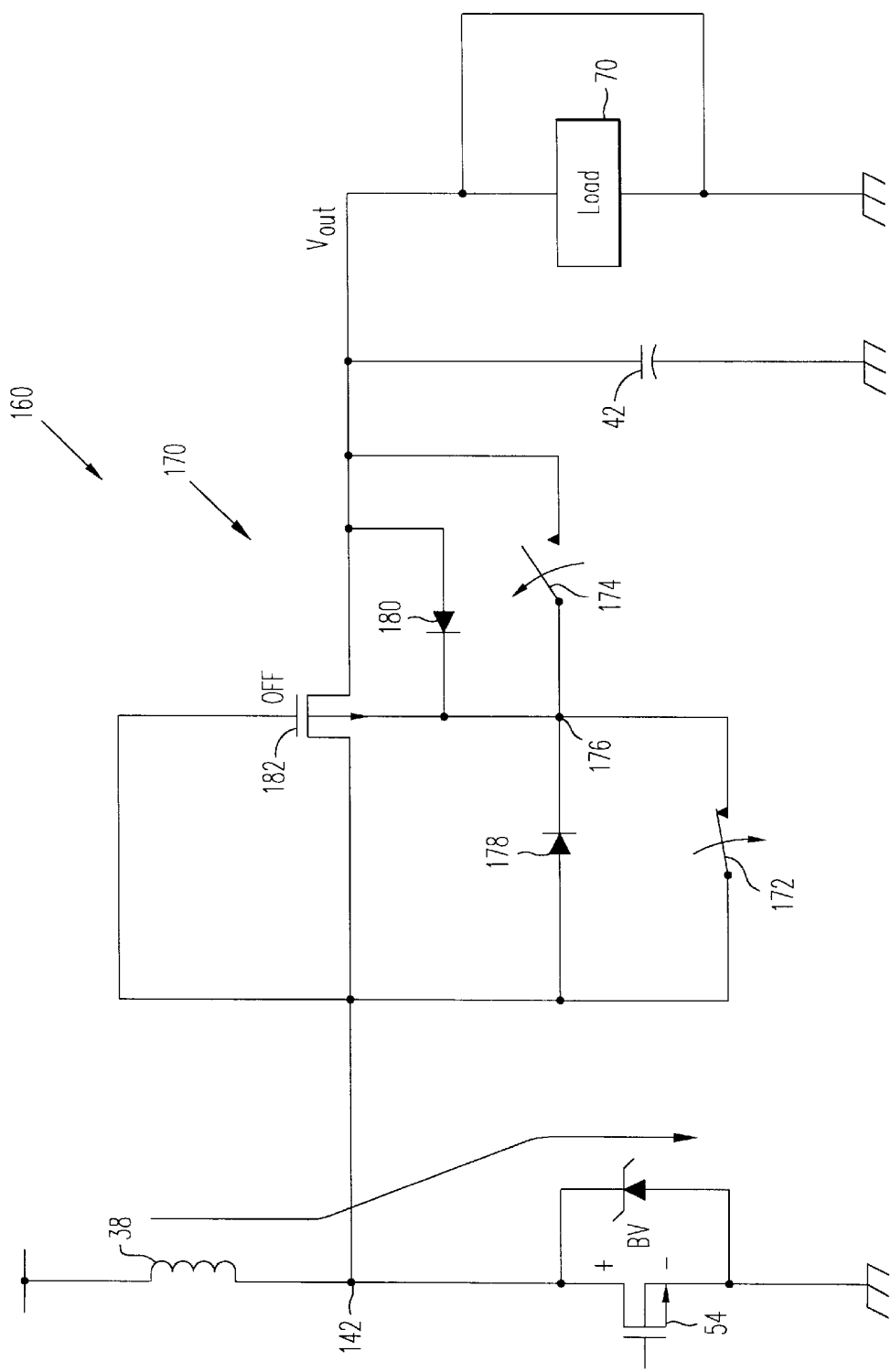
FIG. 11*d* schematically illustrates a boost converter with disconnect PMOSFET during shorted load, disconnect operation.

In FIG. 11d, a shorted load 70 is disconnected from inductor 38 by connecting MOSFET body 176 through body-to-source switch 172 to inductor 38 and by simultaneously opening body-to-drain switch 174 to disconnect MOSFET body 176 from output Vout. When load 70 is shorted, output voltage Vout is at ground, which is the most negative potential in the circuit. Node 142, on the other hand, is the most positive potential, because it is connected to through inductor 38 to power source Vbatt. Therefore by shorting MOSFET body 176 through body-to-source switch 172 to node 142 and opening body-to-drain switch 174 from MOSFET body 176 to output voltage Vout, an intrinsic body-to-drain diode 180 is reverse biased and therefore non-conducting. Simultaneously MOSFET gate 182 is also connected to node 142, which is the most positive voltage in the circuit, turning off four-terminal P-channel MOSFET 170 and thereby blocking all overcurrent from node 142 to shorted load 70. Voltage clamping of node 142 can be achieved by diode 174, MOSFET 54, or the clamping methods described in FIG. 10, namely, a grounded zener diode, a diode network (two back-to-back diodes) between node 142 and Vbatt, or a capacitor in parallel with diode 180.

Figure 12:
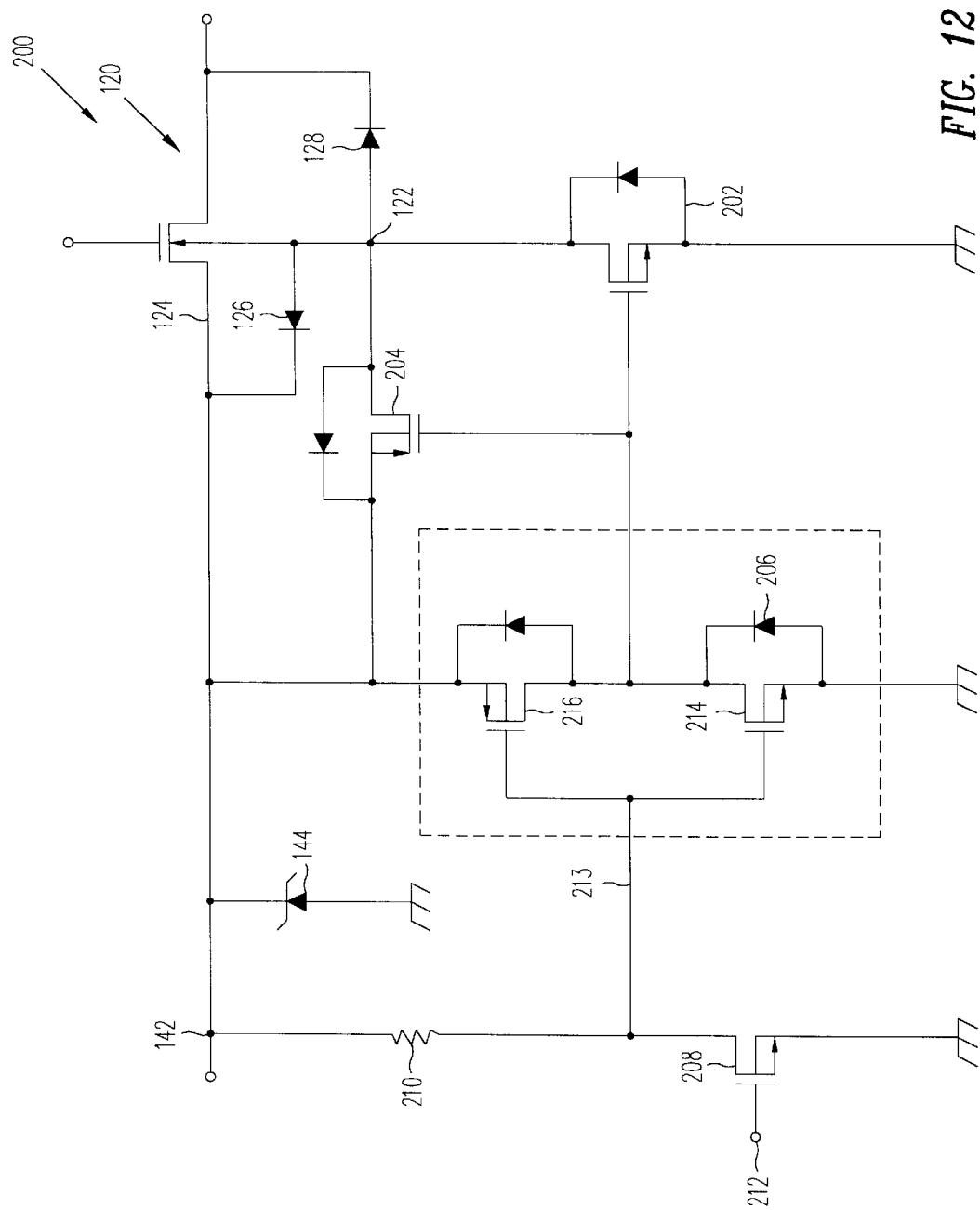
FIG. 12 schematically illustrates a disconnect NMOSFET with an overcurrent shutdown circuit incorporating an NMOS and a PMOS.

An example of an overcurrent shutdown (OCSD) circuit 200 incorporating N-channel four-terminal MOSFET 120 as a synchronous rectifier (see FIGS. 9a–9d) is shown in FIG. 12, where grounding switch 136 is represented by an N-channel MOSFET (NMOS) 202 and source-to-body shorting switch 134 is represented by a P-channel MOSFET (PMOS) 204. Provided that their gate oxide thicknesses are chosen thick enough to survive the full operating voltage, these two MOS switches 202, 204 may be driven rail-to-rail by a common CMOS inverter 206. To simplify direct connection to external control circuitry CMOS inverter 206 can be driven from a single grounded N-channel MOSFET (NMOS) 208 with a gate input 212 and a pull-up resistor 210. Input 212 is connected to overcurrent sensing circuitry (see FIG. 15), which generates, for example, a high signal during an overcurrent fault and a low signal in normal operation. With a low input 212, NMOS 208 is turned off, so that pull-up resistor 210 pulls up the input 213 to CMOS inverter 206, turning on the CMOS inverter's N-channel 214 and turning off its P-channel 216, thus connecting the output of CMOS inverter 206 to ground. With the inverter output grounded, PMOS switch 204 is turned on, shorting body 122 of four-terminal MOSFET 120 to source 124. NMOS switch 202 is turned off, disconnecting MOSFET body 122 from ground. This condition draws no power and is the normal operating mode.

When a shorted load occurs, input 212 is brought high by overcurrent sensing circuitry, input 213 to CMOS inverter 206 goes low and its output goes high, turning off PMOS switch 204 while turning on grounded NMOS switch 202, thereby tying MOSFET body 122 to ground. In this overcurrent fault condition, both intrinsic diodes 126, 128 internal to four-terminal MOSFET 120 become reverse biased, and pull-up resistor 210 draws moderate power.

Figure 13:
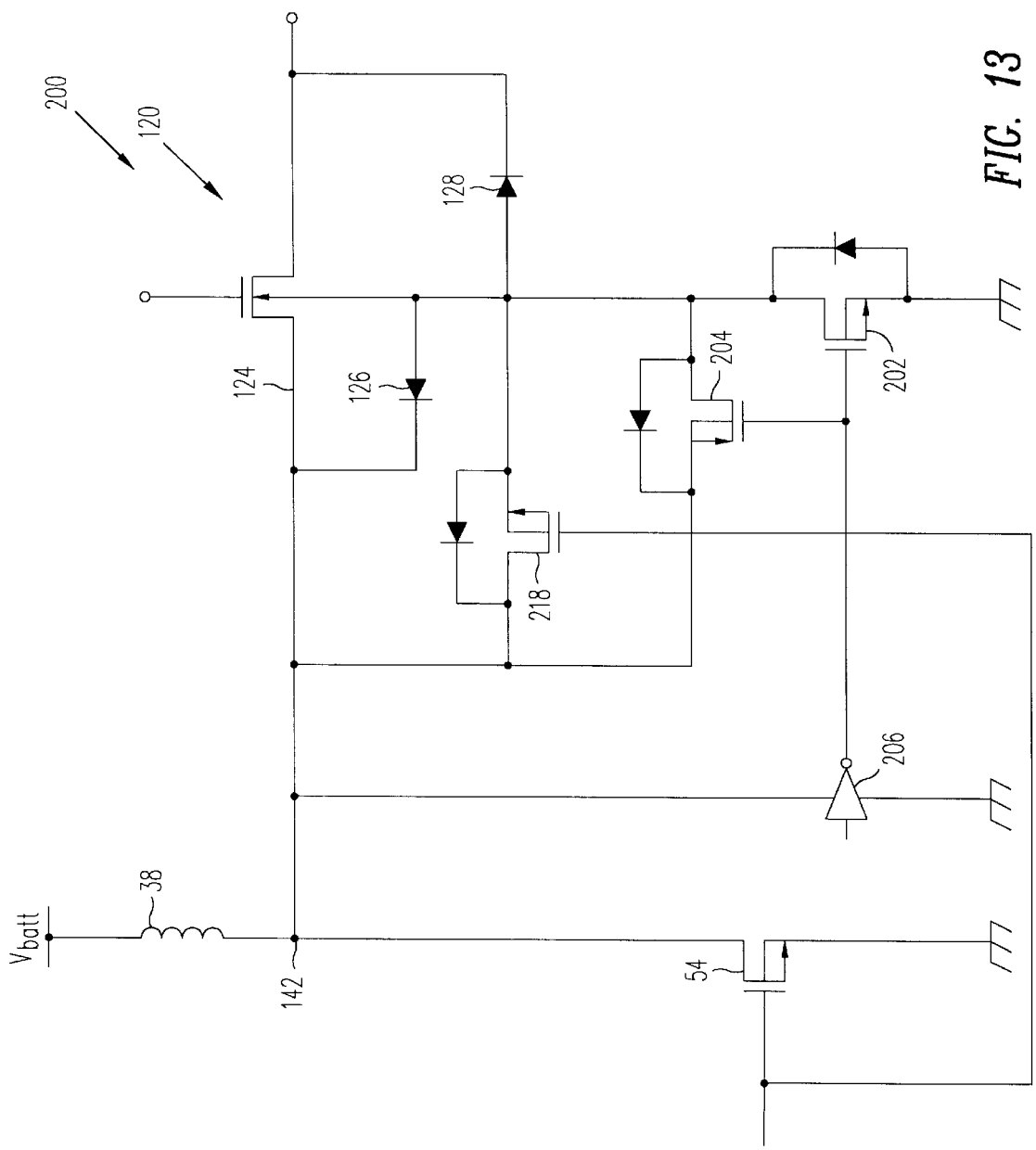
FIG. 13 schematically illustrates a disconnect NMOSFET with an overcurrent shutdown circuit incorporating an additional NMOS for body bias during energizing of the inductor.

If node 142 is brought very close to ground (for example when inductor 38 is being energized), then PMOS switch 204, since it derives its gate and drain voltages from node 142, may not have adequate voltage to maintain a conductive channel for reliable shorting of MOSFET body 122 to source 124. As shown in FIG. 13, this problem may be corrected by connecting an 20 additional NMOS switch 218 in parallel with PMOS switch 204. NMOS switch 218 is on whenever the input to low-side switch 54 is high and node 142 is near ground during energizing of inductor 38.

Figure 14:
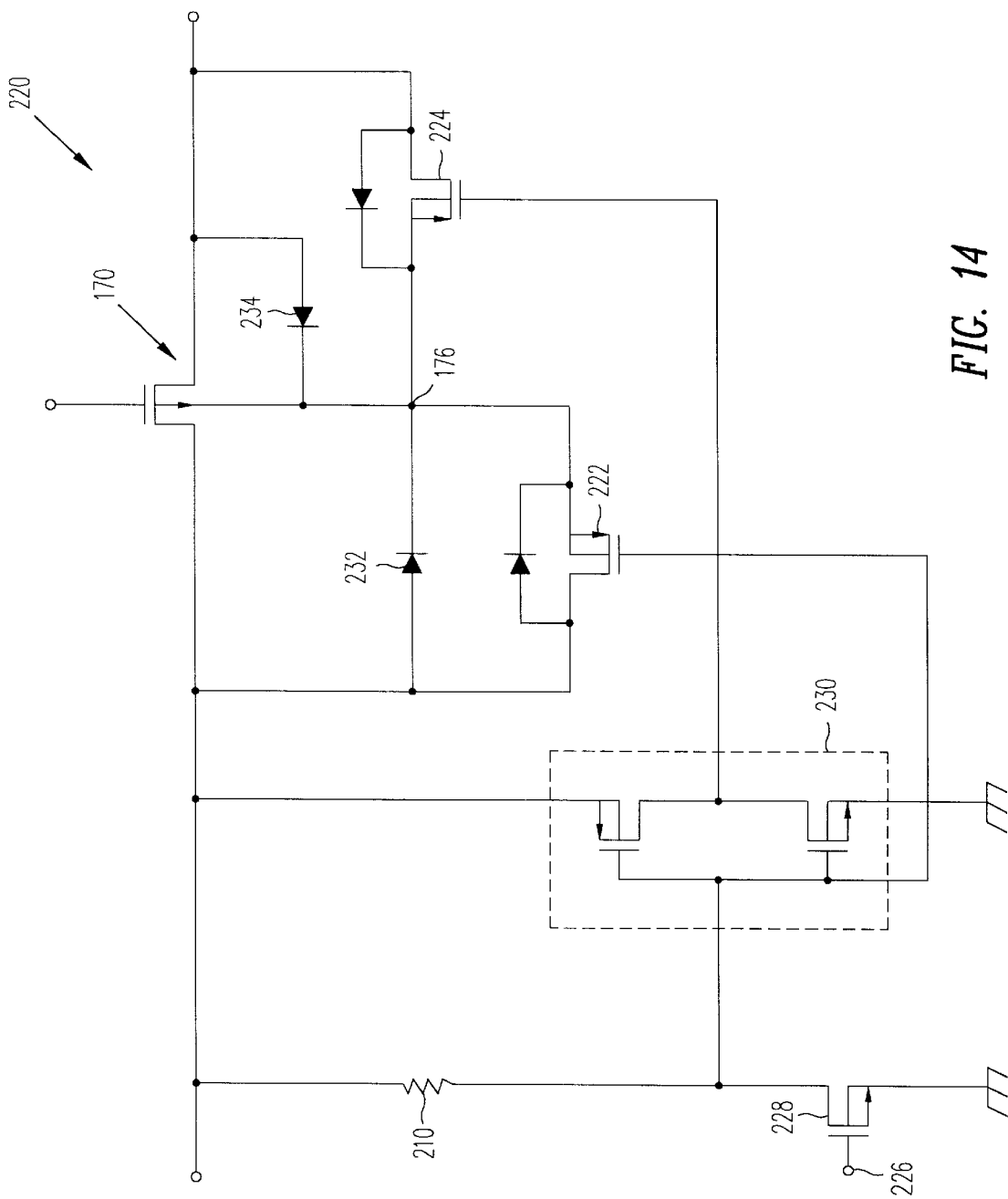
FIG. 14 schematically illustrates a disconnect PMOSFET with an overcurrent shutdown circuit incorporating two PMOS switches.

An example of an overcurrent shutdown (OCSD) circuit 220 incorporating a body four-terminal P-channel MOSFET 170 is shown in FIG. 14, where two PMOS switches 222, 224 form a body switching network. Four-terminal P-channel MOSFET 170 incorporates intrinsic diodes 232, 234. Input 212 is connected to overcurrent sensing circuitry (see FIG. 15), which generates, for example, a high signal during an overcurrent fault and a low signal in normal operation. In normal operation, when the OCSD (overcurrent shutdown) input 226 is low, an NMOS 228 is turned off with a high drain voltage so that the inductor side PMOS switch 222 is turned off, whereas the output of CMOS inverter 230 is low so that output side PMOS switch 224 is turned on. In normal operation current flows from left to right through source-to-body intrinsic diode 232 and through a short circuit comprising output side PMOS switch 224 during the break-before-make interval, until four-terminal P-channel MOSFET 170 is turned on and then carries the current.

Applying a high drive signal to OCSD input 226 pulls the drain of NMOS 228 low, reversing the connections through PMOS switches 222, 224 to MOSFET body 176, thereby shorting source-to-body intrinsic diode 232, connecting MOSFET body 176 to the most positive potential at node 142, and disconnecting right side PMOS 224. Therefore, during a short circuit fault, in which the left side voltage is high and the right side voltage is low, normally conducting source-to-body intrinsic diode 232 is shorted, and output-to-body intrinsic diode 234 is reverse biased, thus blocking overcurrent flow. A voltage clamping method (see for example FIGS. 10a–10c) may be applied to limit the maximum voltage excursion when MOSFET body 176 connections are switched through PMOS switches 222, 224.

In addition to the methods illustrated in FIGS. 12–14, switching of body 122 and body 176 may be accomplished by means of other types of solid state switches, relays, or combinations thereof.

Figure 15:
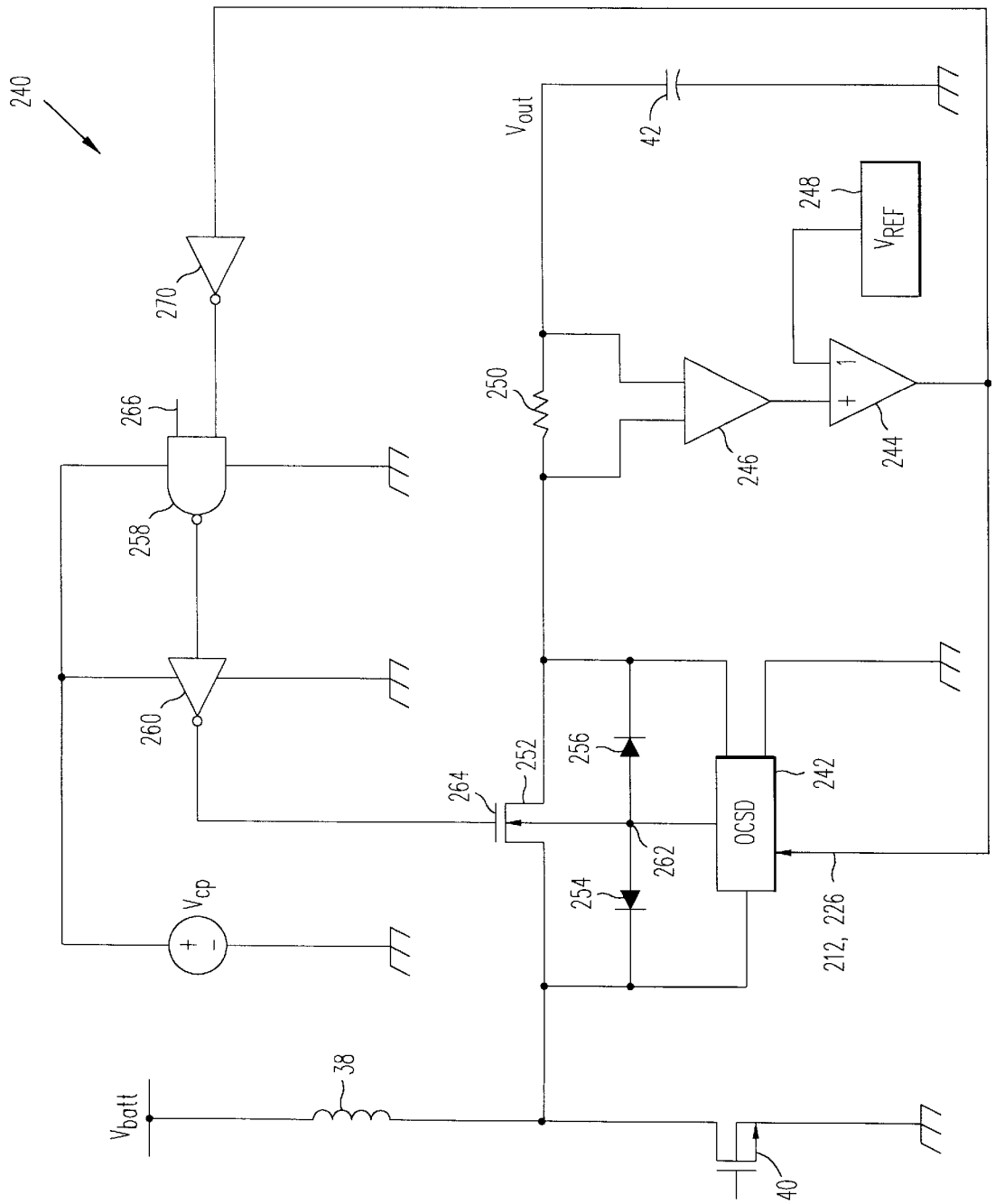
FIG. 15 is a block diagram illustrating the use of a current sensing resistor in an overcurrent shutdown system.

FIG. 15 illustrates a system implementation of an overcurrent shutdown (OCSD) circuit 240, comprising inductor 38, low-side switch 40, filter capacitor 42, a four-terminal rectifier MOSFET 252 with two intrinsic diodes 254, 256, and an OCSD body circuit 242, incorporating for example circuitry illustrated in FIGS. 12–14, accepting alternatively inputs 212, 226, and containing NMOS 208, 228, CMOS inverter 206, and MOS devices 202, 204 or 222, 234 that switch the body 262 of four-terminal rectifier MOSFET 252.

OCSD body circuit 242 is driven by the output of a comparator 244, which compares the voltage output of an op amp 246 to a reference voltage 248. Op amp 246 measures the voltage drop across a voltage sensing resistor 250 and thereby measures the output current. In normal operation, the voltage across sensing resistor 250 is lower than reference voltage 248, and the output of comparator 244 is low. In a short circuit overcurrent condition, however, the voltage across sensing resistor 250 is higher than the reference voltage 248, and the output of comparator 244 becomes high. A high drive signal is applied to the input of OCSD body circuit 242, triggering switching of the body bias of four-terminal rectifier MOSFET 252 and reverse biasing of one or more diodes 254, 256 to block overcurrent conduction.

The output signal from comparator 244 also runs through an inverter 270 to an input terminal of a NAND gate 258, which is connected to the gate 264 of four-terminal rectifier MOSFET 252 through a series inverter 260. Another input terminal of NAND gate 258 is connected to a line 266 which carries the signal that normally controls the MOSFET gate 264. Under short circuit fault conditions, however, a high drive signal from comparator 244 after inversion through inverter 270 causes NAND gate 258 to ground MOSFET gate 264, thus turning off four-terminal rectifier MOSFET 252. Alternatively op amp 246 may monitor the voltage drop across four-terminal rectifier MOSFET 252.

The four-terminal MOSFET, having separate terminals for source, drain, body and gate, is described in U.S. Pat. No. 5,689,144, cited above. The implementation of a four-terminal MOSFET may be facilitated in either a lateral, vertical, or quasi-vertical structure.

Figure 16A:
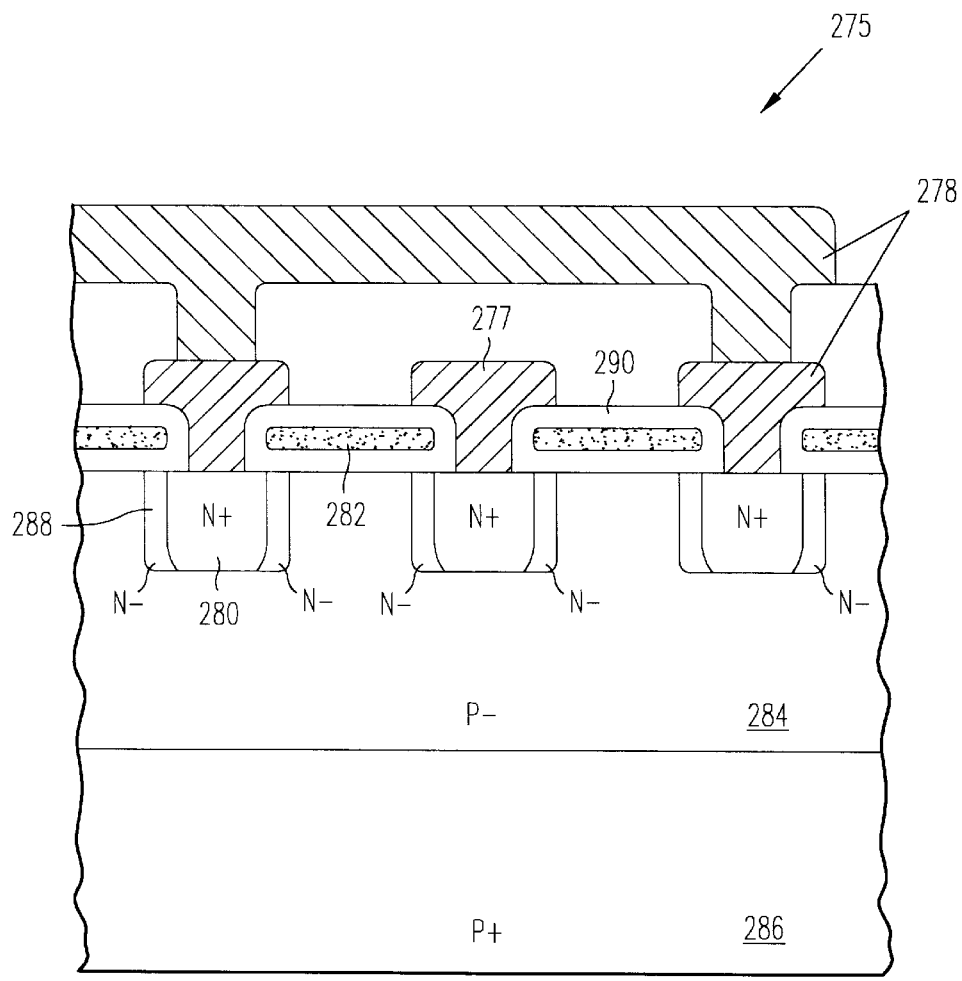
FIG. 16*a* is a cross-sectional view of a four-terminal lateral MOSFET.

FIG. 16a is a cross-sectional view of a four-terminal lateral MOSFET 275. A common P-well or P-epi region (hereinafter P-well 284) is formed in a P+ substrate 286.

P-well 284 has a peak surface dopant concentration generally in the range of $8\times10^{15}$ atoms $cm^{-3}$ to $5\times10^{16}$ atoms $cm^{-3}$ and a depth of 1.5 μm to 6.0 μm, consistent with conventional CMOS fabrication art. An array of parallel N+ source/drain stripes (hereinafter N+ stripes 280) separated by and generally self-aligned to an array of parallel polysilicon gate electrodes 282 is formed in P-well 284. N+ stripes 280 have depths generally from 0.2 μm to 1.5 μm and surface dopant concentrations in a range of $2\times10^{19}$ atoms $cm^{-3}$ to $7\times10^{19}$ atoms $cm^{-3}$. An optional sidewall spacer 288 generally having a thickness of 0.25 μm and a dopant concentration in a range of $1\times10^{16}$ atoms $cm^{-3}$ to $1\times10^{19}$ atoms $cm^{-3}$, may be located below and adjacent a gate sidewall 290. Illustratively, alternating sets of N+ stripes 280 are interconnected by means of source contacts 277 or drain contacts 278, respectively.

Figure 16B:
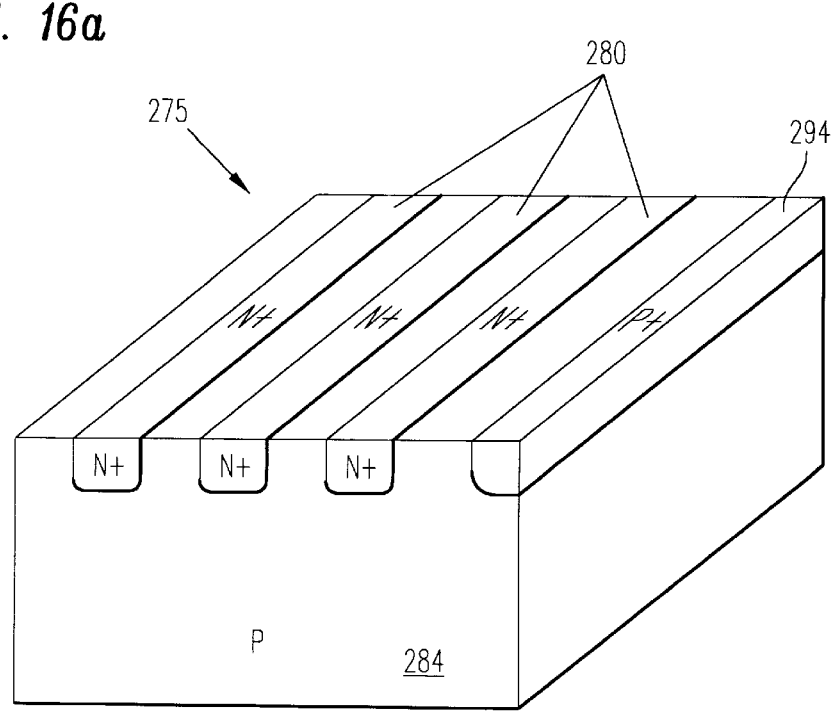
FIG. 16*b* is a perspective view of four-terminal lateral MOSFET.

FIG. 16b is a perspective view of four-terminal lateral MOSFET 275 shown in cross-section in FIG. 16a. As shown, P-well 284 (body region) may be contacted by forming a P+ contact stripe 294.

Figure 16C:
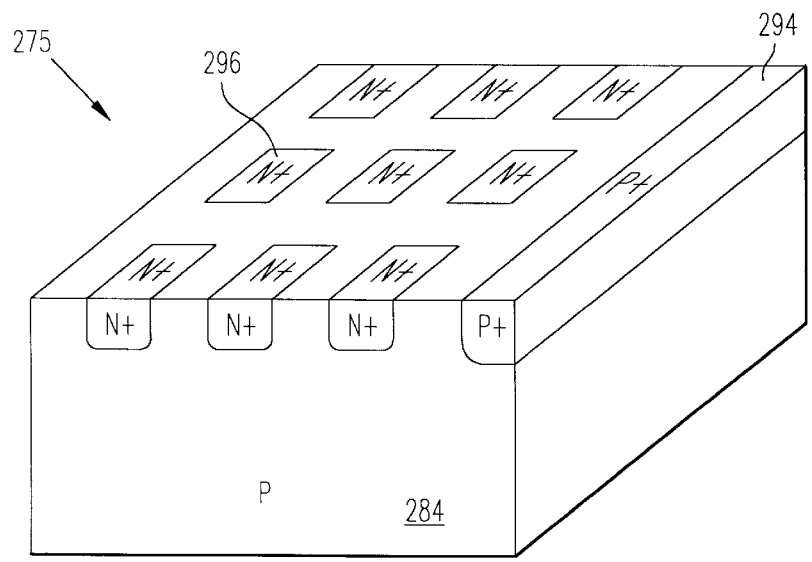
FIG. 16*c* is a perspective view of an alternative version of a four-terminal lateral MOSFET having an alternating grid of source/drain cells.

FIG. 16c is a perspective view of an alternative version of four-terminal lateral MOSFET 275 having an alternating grid of source/drain cells 296, which can be connected together with diagonal electrically conductive strips (not shown), as is familiar in the art. In the version shown in FIG. 16c, a body contact is also illustrated as P+ contact stripe 294.

Figure 16D:
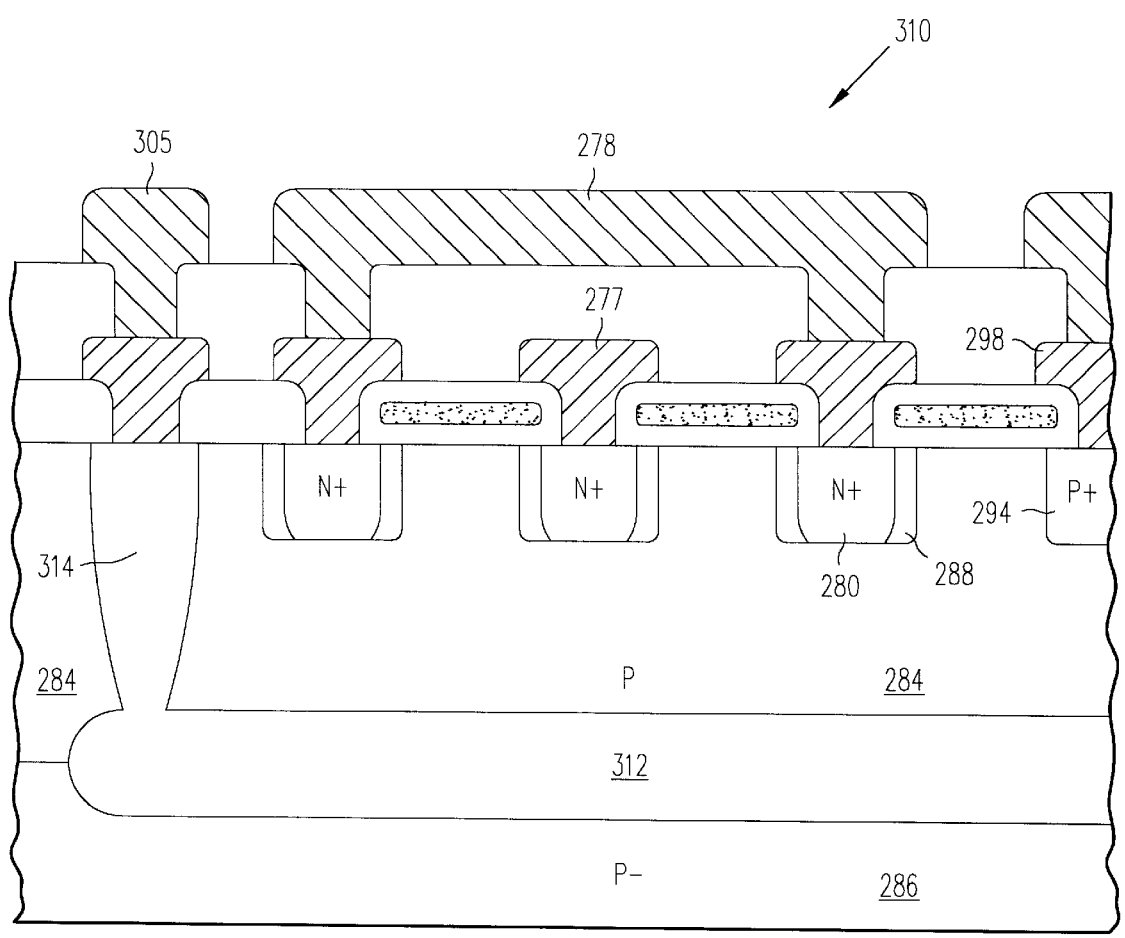
FIG. 16d is a cross-sectional view of an isolated version of a four-terminal MOSFET having an N-type buried layer.

FIG. 16d is a cross-sectional view of an isolated version of a four-terminal MOSFET 310 having an N-type buried layer 312 with a sheet resistivity generally in a range of 16 ohms per square to 40 ohms per square. Buried layer 312 overlaps an annular N-well ring 314 to facilitate connection by means of an isolation contact 305. Buried layer 312 electrically isolates P-well 284 (body region) from P+ substrate 286. As in four-terminal lateral MOSFET 275, isolated P-well 284 (body region) may be contacted by forming a P+ contact stripe 294, which in turn is connected to a body terminal (not shown) by means of a body contact 298. As previously described (see FIG. 16a), N+ stripes 280 having optional sidewall spacers 288 are formed in P-well 284 and are alternately interconnected by means of source contacts 277 or drain contacts 278, respectively.

Figure 17B:
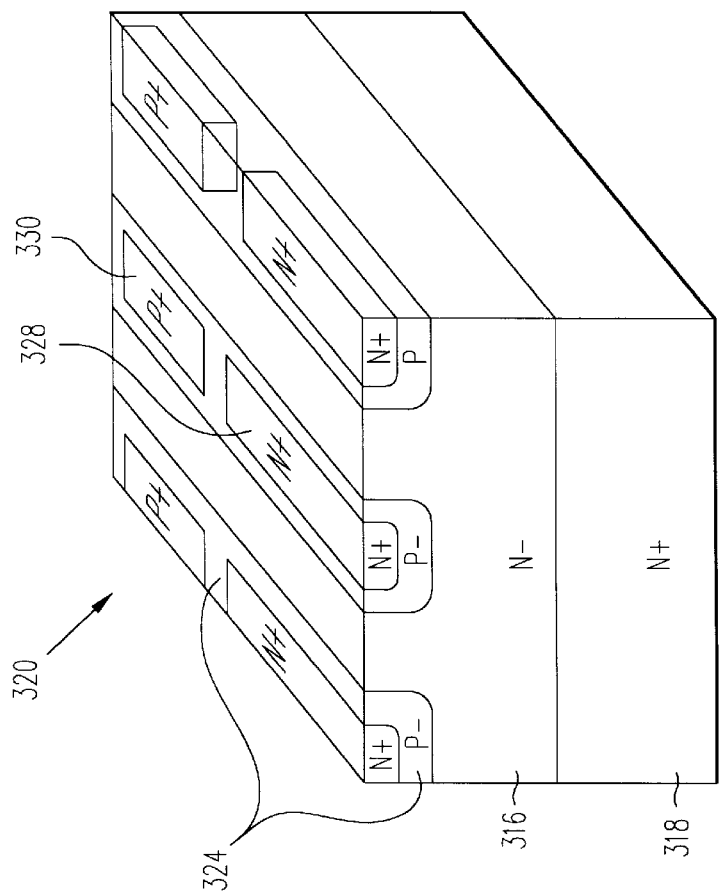
FIG. 17b is a perspective view of a four-terminal vertical planar DMOS.
Figure 17A:
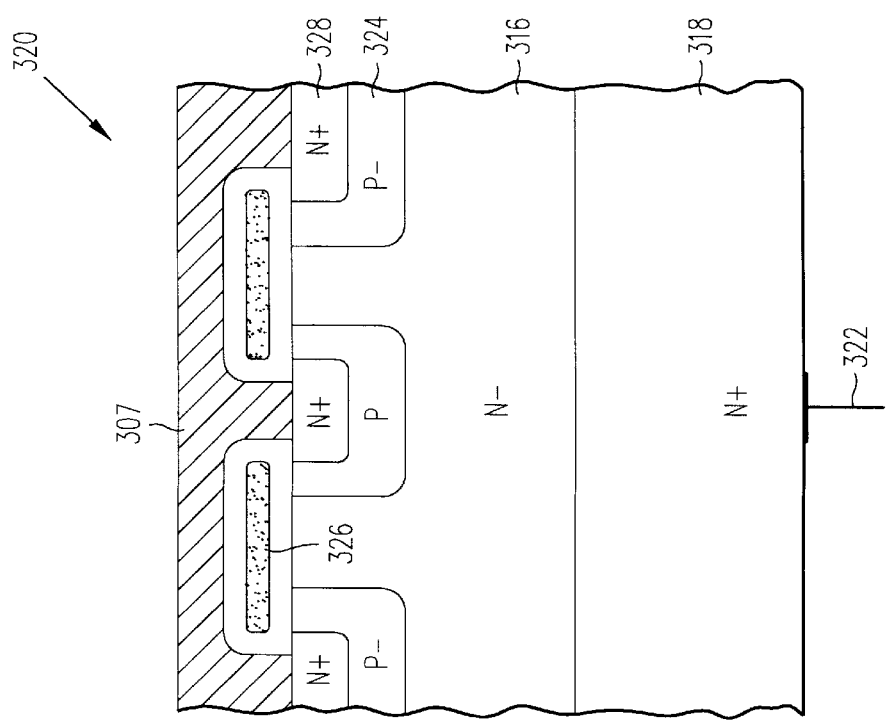
FIG. 17a is a cross-sectional view of a four-terminal vertical planar DMOS having an N-epi well formed in an N+ substrate with a backside drain contact.

FIG. 17a is a cross-sectional view of a four-terminal vertical planar DMOS 320 having an N-epi layer 316 formed on an N+ substrate 318, with a backside drain contact 322. Formed in N-epi layer 316 and self-aligned to an array of parallel polysilicon gates 326 are P-body diffusions 324 generally having depths in a range of 0.7 μm to 3.5 μm. Extending across the openings between polysilicon gates 326 are N+ source diffusions 328 having dopant concentrations generally in a range of $5\times10^{19}$ atoms cm to $9\times10^{19}$ atoms $cm^{-3}$. Illustratively, N+ source diffusions 328 are interconnected by means of a source contact 307.

FIG. 17b is a perspective view of four-terminal vertical planar DMOS 320 shown in cross-section in FIG. 17a. P-body 324 extends beyond N+ source diffusions 328 and is contacted in the third dimension (perpendicular to the cross-sectional plane of FIG. 17a) by forming P+ contact stripes 330.

Figure 18:
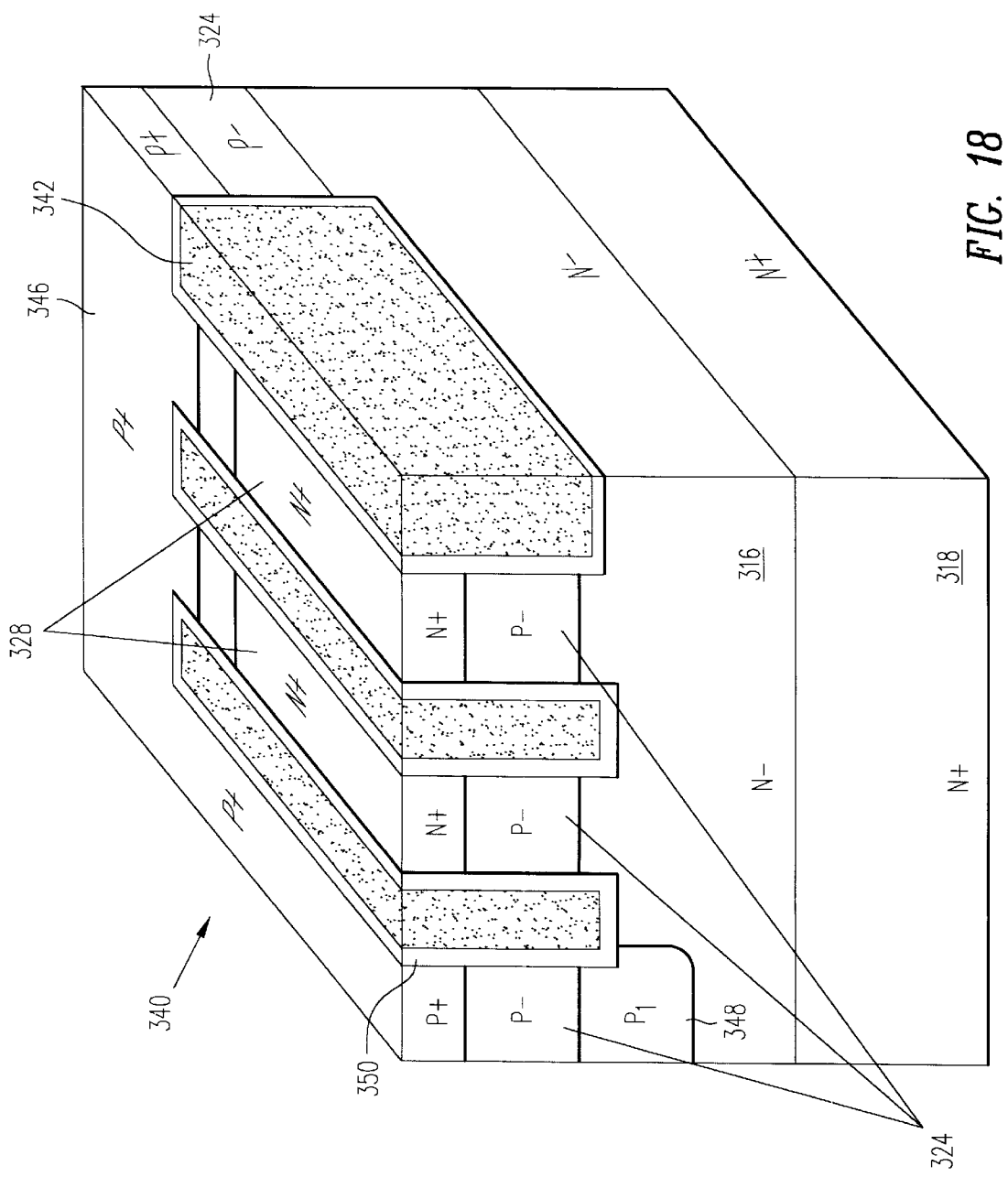
FIG. 18 is a perspective view of a four-terminal trench gated MOSFET.

FIG. 18 is a perspective view of a four-terminal trench gated MOSFET 340 having a source region similar in structure to that of four-terminal vertical planar DMOS 320 (body contacted in the 3rd dimension). N+ source diffusions 328 overlie P-body diffusions 324 embedded between trench gates 342. P-body diffusions 324 extend beyond trench gates 342 and are contacted in the third dimension by forming a P+ contact stripe 346. A P-well 348, formed in N-epi layer 316, forms a clamping diode with N-epi layer 316 to avoid avalanche breakdown and consequent hot carrier generation at the PN-junction between P-body 324 and N-epi layer 316 in the vicinity of oxide layers 350 bordering trench gates 342.

All other circuit elements employed in the embodiments are familiar in the art and are commercially available. If desired a set of such circuit elements may be packaged together utilizing thin-film or thick-film circuit technology.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

I claim:

1. A DC—DC converter comprising:
    an inductor and a MOSFET switch connected in series between a supply voltage and ground; and
    a disconnect MOSFET connected to a common node between said inductor and said MOSFET switch, said disconnect MOSFET comprising:
        a first parasitic diode between a body and a first terminal of said disconnect MOSFET and
        a second parasitic diode between said body and a second terminal of said disconnect MOSFET;
    a first switch connected in parallel with said first parasitic diode; and
    an overcurrent sensing circuit coupled to a current path through said disconnect MOSFET and responsive to an excessive current through said disconnect MOSFET, said first switch being opened in response to an output signal from said overcurrent sensing circuit.

2. The DC—DC converter of claim 1 further comprising a second switch connected between said body and ground, said first switch being open when said second switch is closed.

3. The DC—DC converter of claim 2 further comprising a third switch connected to a gate of said disconnect MOSFET, said third switch being for connecting said gate to a first voltage so as to turn said disconnect MOSFET on or to a second voltage so as to turn said disconnect MOSFET off.

4. The DC—DC converter of claim 3 wherein said third switch is responsive to an output of said overcurrent sensing circuit.

5. The DC—DC converter of claim 4 wherein a signal indicating an overcurrent condition at an output of said overcurrent sensing circuit causes said third switch to turn said disconnect MOSFET off.

6. The DC—DC converter of claim 2 wherein said first switch comprises a first MOSFET and said second switch comprises a second MOSFET.

7. The DC—DC converter of claim 6 wherein one of said first and second MOSFETs is a P-channel MOSFET and the other of said first and second MOSFETs is an N-channel MOSFET and the respective gates of said first and second MOSFETs are coupled together.

8. The DC—DC converter of claim 7 wherein a voltage at said gates of said first and second MOSFETs is responsive to an output signal from said overcurrent sensing circuit.

9. The DC—DC converter of claim 1 further comprising a conductive path containing a zener diode, said conductive path being connected in parallel with said inductor.

10. The DC—DC converter of claim 9 wherein said conductive path comprises a second diode in series with said zener diode.

11. The DC—DC converter of claim 1 wherein said disconnect MOSFET is an N-channel MOSFET, said first switch being connected between said common node and said body.

12. The DC—DC converter of claim 1 wherein said disconnect MOSFET is a P-channel MOSFET, said first switch being connected between an output terminal of said DC—DC converter and said body.

13. The DC—DC converter of claim 12 further comprising a second switch connected in parallel with said second parasitic diode, said second switch being open except when an excessive current is flowing through said disconnect MOSFET.

14. The DC—DC converter of claim 1 further comprising a zener diode connected between said common node and ground.

15. The DC—DC converter of claim 14 further comprising a snubber capacitor connected between said common node and said body.

16. The DC—DC converter of claim 1 further comprising a current sense resistor connected in a current flow path through said disconnect MOSFET for detecting the presence of said excessive current.

17. The DC—DC converter of claim 16 further comprising a comparator having an input terminal coupled to said current sense resistor, an output of said comparator being coupled to an input terminal of said overcurrent sensing circuit.

18. The DC—DC converter of claim 1 wherein said overcurrent sensing circuit comprises a sensing resistor connected in said current path through said disconnect MOSFET.

19. The DC—DC converter of claim 18 wherein said overcurrent sensing circuit further comprises a comparator coupled to said sensing resistor.

20. The DC—DC converter of claim 19 wherein said first switch is responsive to a signal at an output of said comparator.

21. The DC—DC converter of claim 20 wherein said second switch is responsive to said signal at said output of said comparator.

22. A method of protecting a load against an excessive current when said load becomes short-circuited, said method comprising the steps of:

connecting said load to a four-terminal MOSFET, said MOSFET comprising a first parasitic diode between a body and a first terminal of said MOSFET and a second parasitic diode between said body and a second terminal of said MOSFET, said first diode being directed in opposition to a normal direction of current through said load;

connecting a switch in parallel with said first diode;

closing said switch when said load is drawing a normal current;

sensing an overcurrent condition in said load; and opening said switch in response to said overcurrent condition.

23. The method of claim 22 comprising the further step of biasing a gate of said MOSFET so as to turn a channel of said MOSFET off in response to said overcurrent condition.

24. The method of claim 22 comprising the further step of connecting said body of said MOSFET to ground in response to said overcurrent condition.

* * * * *